United States Patent [19]

Matsumoto

[11] Patent Number: 5,539,923
[45] Date of Patent: Jul. 23, 1996

[54] WIRELESS MOBILE TELEPHONE SYSTEM WITH ZONE SELECTION CONTROL

[75] Inventor: Shinji Matsumoto, Amagasaki, Japan

[73] Assignee: Mitsubishi Denki Kabushiki Kaisha, Tokyo, Japan

[21] Appl. No.: 215,784

[22] Filed: Mar. 22, 1994

[30] Foreign Application Priority Data

Mar. 26, 1993 [JP] Japan .................... 5-068025

[51] Int. Cl.⁶ .................................. H04Q 7/00
[52] U.S. Cl. .................. 455/33.4; 455/33.1; 455/33.2; 455/54.2; 455/56.1; 379/59
[58] Field of Search .................... 455/33.1, 33.3, 455/33.4, 34.2, 34.1, 54.1, 54.2, 56.1, 67.1, 33.2; 379/58, 59, 60

[56] References Cited

U.S. PATENT DOCUMENTS 5,212,806   5/1993   Natarajan ................ 455/56.1
5,379,448   1/1995   Ames et al. ............... 455/33.4

FOREIGN PATENT DOCUMENTS 4180314   6/1992   Japan .

Primary Examiner—Reinhard J. Eisenzopf
Assistant Examiner—Doris To
Attorney, Agent, or Firm—Rothwell, Figg, Ernst & Kurz

[57] ABSTRACT

A mobile telephone apparatus operates as follow: when an origination signal is transmitted from the mobile station, the base station of a wireless zone where the mobile station is not present communicates a connection possible signal to the base station in the zone where the mobile station is present, and the base station having a larger number of idle channels than that of the other base station is selected on priority basis independent on the signal intensity. Therefore, when the origination signal from the mobile station is received by a plurality of base stations, the base station having the receiving level larger than the required minimum receiving level and having the maximum number of idle channels is selected, and it is possible to reduce the origination loss rate relative to the conventional system.

7 Claims, 18 Drawing Sheets

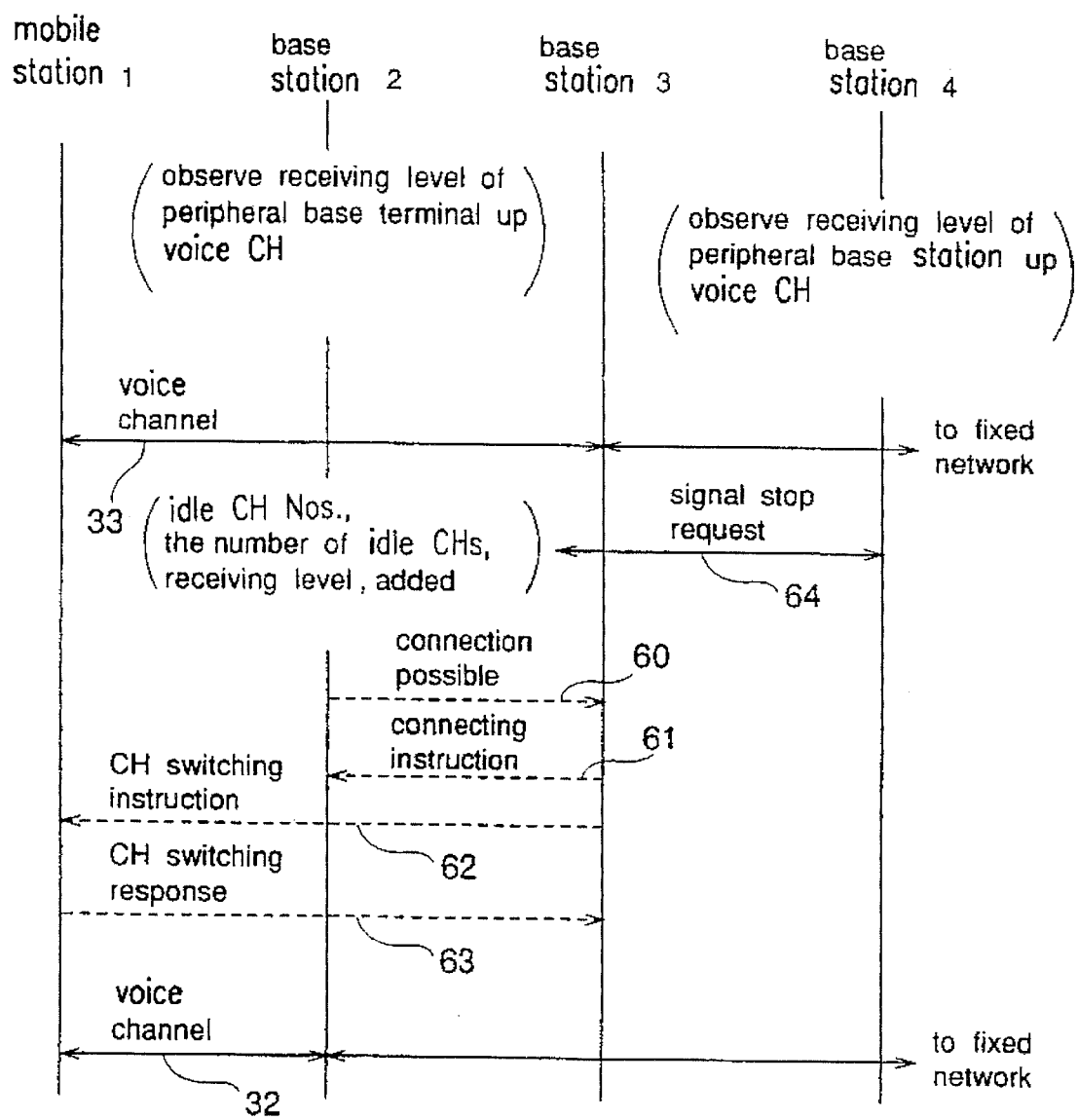

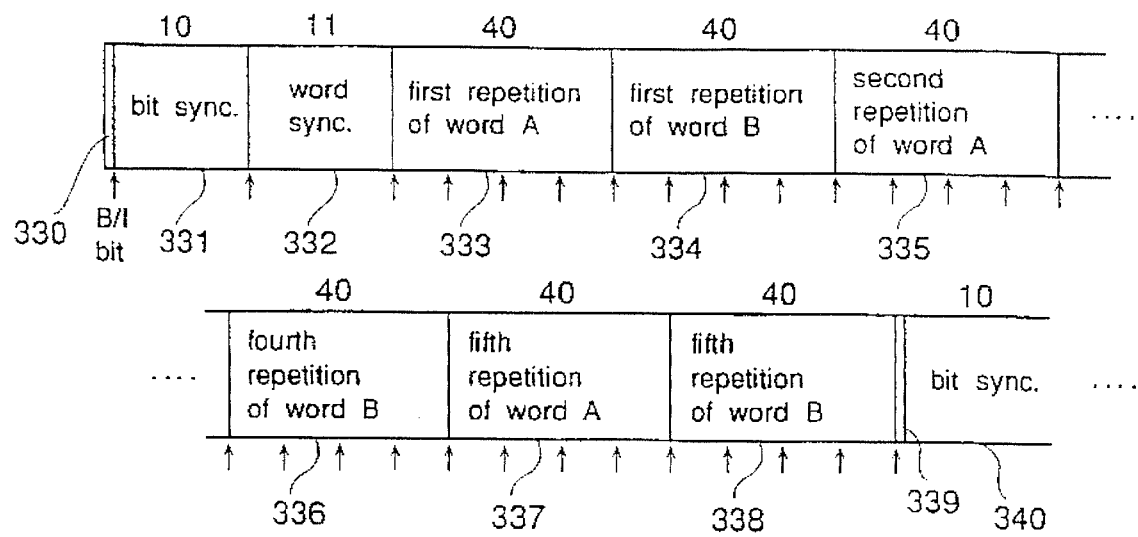
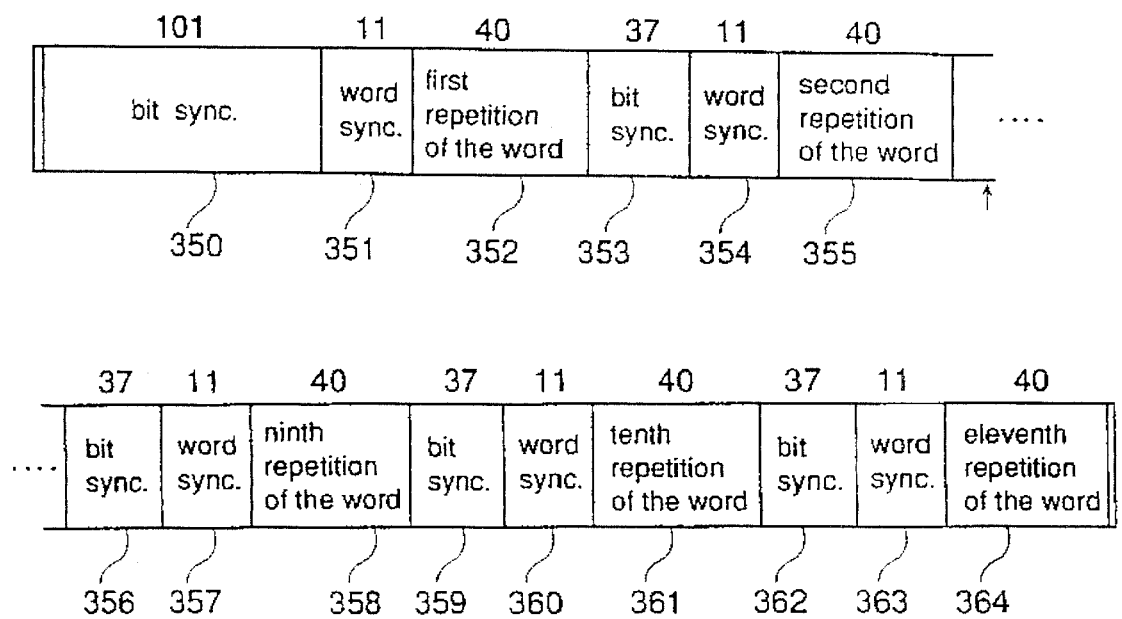

5,539,923

WIRELESS MOBILE TELEPHONE SYSTEM WITH ZONE SELECTION CONTROL

FIELD OF THE INVENTION

The present invention relates to a wireless mobile telephone system and, more particularly, to an improvement in the control system for assigning a voice channel to a mobile station in a wireless mobile telephone system of a cellular system.

BACKGROUND OF THE INVENTION

The wireless mobile telephone system of a cellular system includes a plurality of wireless base stations each arranged and fixed at each of cell regions which are produced by dividing an area over which a telephonic communication service is available into a plurality of regions, and mobile stations which are mounted in a moving body such as an automobile and communicate with the wireless base station, wherein several of the wireless base stations produce a group.

In such a prior art wireless mobile telephone system, the cell region has conventionally, for example, a size of 1–10 km, but recently a micro cell system is proposed in which the size of the cell is small as, for example, 500 m. This system has an effect that low transmission powers are sufficient for the mobile station and for the base stations due to the small size of the cell region while the fundamental construction of the system is the same as the usual cell system. In addition, a miniature sized battery is sufficient for the mobile station and thereby the apparatus is minimized. The lifetime of the battery for the mobile station is also lengthened, and a long time telephonic communication is possible. Further, it is possible to offer a telephonic communication service even to an area where no service is available due to being beyond the reach of electric wave in a large zone system, for example, by employing a wall hanging type base station in a building, in an underground town, in a tunnel of a subway, or the like.

In many of such prior art wireless mobile telephone systems, because a fixed channel is assigned to each wireless zone, there may be an idle channel in a peripheral zone even when some wireless zone has no idle channel. In addition, differently from in wire communication systems, boundaries between the wireless zones are not clear and usually overlapping areas are produced where the mobile station can be connected to any of the base stations of the wireless zones which own the overlapping zones jointly.

Accordingly, for a mobile station existing in this overlapping channel it is possible to perform a so-called other zone selection connecting a mobile station employing an idle channel of the other zone even when there is no idle channel in some wireless zone.

Such other zone selection is particularly effective in a micro cell system. It is because, while in a large zone system the base station can hold a lot of channels, i.e., sixteen to ninety channels, in the micro cell system the base station can hold only quite a small number of channels, for example, four channels, and also because in this micro cell system, since the ratio of the overlapping area occupying the area of the cell is large relative to the large zone system, it is possible to reduce the origination loss, i.e., the states of waiting telephonic communication, when the mobile station is present in the overlapping area and the base station has no idle channel by assigning a channel to the other base station producing the overlapping area.

FIG. 12 is a diagram illustrating a construction of a wireless mobile telephone system performing such other system selection according to a prior art. The system construction is disclosed in FIG. 5 as a prior art system construction of other zone selection system in Japanese Published Patent Application Hei. 4-180314. FIG. 13 is a diagram illustrating a sequence of this other zone selection disclosed in FIG. 6 of the Published Application.

FIGS. 17 to 20 are diagrams illustrating signal formats of the control channel and the voice channel in such a system. FIG. 17 shows a transmission message in the control channel from the mobile station to the base station, FIG. 18 shows a transmission message in the voice channel from the mobile station to the base station, FIG. 19 shows a transmission message in the control channel from the base station to the mobile station, and FIG. 20 shows a transmission message in the voice channel from the base station to the mobile station.

In FIGS. 12 and 13, reference numeral 1 designates a mobile station of such as an automobile telephone or a portable telephone. Numerals 2, 3, and 4 designate base stations performing a wireless telephonic communication with the mobile station 1. Numeral 5 designates a base station controller performing a line control of respective base stations. Reference numeral 6 designates an origination signal which the mobile station 1 transmits to the base stations 2, 3, and 4. Numerals 7, 8, 9, 10, and 11 designate inter-terminal signals which are transferred between the base stations 2, 3, and 4 and the base station controller 5 for assigning a voice channel to the mobile station 1. Numerals 12, 13, and 14 designate wireless zones over which the base stations 2, 3, and 4 offer telephonic communication services, respectively. Numeral 15 designates an overlapping zone of the wireless zones 12, 13, and 14. It is supposed that the mobile station 1 is present in this overlapping zone 15.

In FIGS. 17, 18, 19, and 20, reference numerals 301, 310, 313, 316, 319, 322, 325, 331, 340, 350, 353, 356, 359, and 362 designate bit synchronization patterns for performing bit synchronization, and reference numerals 302, 311, 314, 317, 320, 323, 326, and 332 designate word synchronization patterns for performing word synchronization. Reference numeral 303 designates a coded digital color code for distinguishing a base station to be accessed when interferences occur at the same frequency. Reference numerals 304 to 306 designate a first, a second, and a third word which are respectively a repetition of words, and one message of origination includes one or a plurality of words and each word is transmitted five times. Reference numeral 312 designates the first word in a first time repetition, numeral 315 designates the first word in a second time repetition, numeral 318 designates the first word in a third time repetition, numeral 321 designates the first word in a fourth time repetition, and numeral 324 designates the first word in a fifth time repetition. Reference numeral 327 designates the second word in a first time repetition and numeral 328 designates the second word in a fifth time repetition. Reference numerals 330, 339 designate a busy/idle bit indicating whether the apparatus is in an operating state or not. Numeral 333 designates word A in a first time repetition, numeral 334 designates word B in a first time repetition, numeral 335 designates the word A in a second time repetition, numeral 336 designates the word B in a fourth time repetition, numeral 337 designates the word A in a fifth time repetition, and numeral 338 designates the word B in a fifth time repetition. Reference numeral 352 designates a word in a first time repetition, reference numeral 355 designates the word in a second time repetition, reference numeral 358 designates the word in a ninth time repetition, numeral 361 designates the word in a tenth time repetition, and numeral 364 designates the word in an eleventh time repetition.

A description is given of the operation with reference to FIGS. 12 and 13. When the mobile station 1 calls in the overlapping zone 15, the origination signal 6 is transmitted through the up control (access) channel common to the zones, and received by the base stations 2, 3, and 4. Respective base stations 2, 3, and 4 add information indicating the receiving level of the origination signal 6 and the presence of an idle channel to the received origination signal 6 and transmit the same to the base station controller 5 as calling signals 7, 8, and 9, respectively.

The base station controller 5 investigates the calling signals 7, 8, and 9 and selects a base station having an idle channel and the maximum receiving level among them. Suppose that the base station 3 is selected in this example, the base station controller 5 transmits a channel request signal 10 to the base station 3. The base station 3 which has received the channel request signal 10 selects a channel and reports the selected channel by a channel reporting signal 11 to the base station controller 5. By the above-described sequence, selection of the other zone is realized.

In the prior art wireless mobile telephone communication method, the selection of the other zone is realized by the above-described sequence. However, because in this system the base station having an idle channel and the maximum receiving level is selected, the base station having a less number of idle channels but the maximum receiving level is priorly selected, whereby in the base station in which the traffics are concentrated, it is still likely to occur origination failure.

In addition, since in this prior art system it is presumed that an access control channel that is common to zones is employed, the selection of other zone is impossible in the system assigning individual control channels to respective base stations.

Further, since the base station controller 5 judges channel selection and other zone selection when all the calling signals 7, 8, and 9 reach the base station controller 5, processing burden to the base station controller 5 is large.

The problem that the processing burden to the base station controller 5 is large is solved by an apparatus disclosed in FIGS. 2 to 4 of the above-described Japanese Published Patent Application Hei. 4-180314 by dispersing the control of the channel selection. In this apparatus, the mobile station observes peripheral zones so as to select wireless zones which become candidates in the other zone selection, and the wireless base station performs assignment of a wireless channel considering all wireless zones as the candidates, thereby effectively utilizing the frequency.

FIGS. 14 to 16 show those disclosed in FIGS. 2 to 4 of the above-described published application.

In FIG. 14, it is assumed that the wireless zone 225 produced by the wireless base station 223 and the wireless zone 226 produced by the wireless base station 224 overlap with each other and the mobile station 222 is present in this overlapping zone. The data line 227 connects the wireless base station 223 and the wireless base station 224. The wireless communication channel 220 is a channel between the base station 224 and the mobile station 222, and the channels 228 and 229 are observing channels for observing the base stations 223, 224 and a wireless control channel transferring information during waiting. The wire transmission line 231 connects the wireless base station 224 and the fixed terminal 232. The fixed terminal 232 communicates with the mobile station.

A description is given of an operation from waiting a communication to assigning a wireless channel in response to a communication connection request with reference to FIG. 15.

First of all, during waiting a communication, the mobile station 222 judges that it is present in the wireless zone 225, and receives the control channel 228 from the wireless base station 223. The wireless base station 223 communicates the frequency of the observed channel in the peripheral zone to be observed during a period not receiving the control information, via the control channel 228.

In this second prior system, the frequency of the control channel 228 of the base station 224 of the peripheral zone is communicated through the control channel 228 to the mobile station 222, and the mobile station 222 switches its frequency to the communicated frequency circulatingly, and measures the receiving level of the overlapping base station 224 itself. When the receiving level of the observed channel of the peripheral zone exceeds the receiving level of the control channel of the zone where the mobile station is present, the mobile station judges that it moved to the other zone and it switches the control channel which it receives, but it constantly measures the channels to be observed of the plurality of peripheral zones communicated through the control channel even after the movement to the other zone.

When a communication connection is requested (233) by occurrence of calling and receiving of calling by the mobile station 222, the mobile station 222 reports the receiving level of the observed channel 229 in the wireless zone 226 as the above-described peripheral zone to the base station 223 using the control channel 228 of the existing zone 225. The base station 223 of the existing zone 225 performs a selection of a wireless channel in response to a communication origination, but if there is no available channel in the base station 223, the base station 223 judges whether the receiving level of the channel observed reported from the mobile station 222 is larger than a predetermined level and any other base station is possible to be connected or not.

In this second prior art system, the mobile station 222 is present in the overlapping area of the wireless zone 225 and the wireless zone 226, the receiving level of the channel observed becomes the maximum, it is judged that the base station 224 is possible to be connected, and the base station 223 inquires 234 the base station 224 through the date line 227 whether there exists an available wireless channel or not in the base station 224.

When there are a plurality of base stations as candidates for base stations that are possible to be connected, an inquire is continued (234) until an available wireless channel is found in the order from a larger receiving level, and the wireless channel which has the maximum receiving level is selected.

When there is a channel response 235 that there is an available channel in the base station 224, a CH setting 236 designating the frequency of the wireless communication channel 220 the mobile station 222 is performed, and a communication path 220 with the fixed terminal 232 is set through the wire transmission path 231.

FIG. 16 show a flowchart for setting a communication path of the above-described system. In a communication waiting state or in a communicating state (step 240), the mobile station 222 is communicated with the frequency of the observed channel of the peripheral zone from the base station 223 through the control channel 228 (step 241). Thereby, the mobile station 222 switches the frequency to that communicated from the base station 223 circulatingly each constant time circulatingly (step 242), and it measures the receiving level of the frequency received from the observed channel (step 243). The receiving level measured of the observed channel and the receiving level of the control channel of the zone where the mobile station 222 is present are compared and when the receiving level of the observed channel exceeds the receiving level of the existing zone (step 244), the mobile station 222 switches the control channel and moves from the wireless zone 225 to the peripheral zone 226 (step 45). After moving the zone, the mobile station 222 measures the receiving level of the observed channel of the plurality of peripheral zones which are communicated through the control channel (step 246).

When a communication connection is requested or a switching of a channel is requested by an origination and receiving origination of the mobile station (step 247), when the mobile station 222 is present in the wireless zone 225, the mobile station 222 reports the receiving level of the observed channel of the wireless zone 226 as one of the peripheral zones using the control channel 228 of the existing-in-zone 225 to the base station 223 (step 248). The base station 223 of the wireless zone 225 where the mobile station 222 is present investigates whether there is an available channel in the base station 223 or not when selecting a wireless channel in response to a communication connection request (step 249), and selects a wireless channel (step 253) and sets a communication path when there is an available channel (step 254).

On the other hand, when there is no available channel with traffics concentrated, the base station 223 compares the receiving level of the observed channel that is reported from the mobile station 222 at step 248 with a prescribed threshold (step 250), and when the receiving level is higher than the threshold value, it investigates whether there is an available wireless channel in the other zone 226 (the above-described observed channel) or not (step 251). When there is an available channel 220 in the other zone 226, the base station 224 designates the frequency of the channel 220 to the mobile station 222 to set a channel (step 252), and sets a communication path with the fixed terminal 232 through the wire transmission path 231.

In the second prior art system illustrated in FIGS. 14 to 16, even in a case where traffics are concentrated in the wireless zone of the base station 223 and there is no channel for setting in the existing mobile station 222, if there is a channel available for the overlapping other zone 226, the other base station 224 can set a channel in the mobile station 222 and set a communication path, whereby it is possible to respond to the origination and receiving origination by the mobile station 222.

In addition, since wireless zones which become candidates in other zone selection are selected by the above-described observation of peripheral zones of the mobile station and assignment of wireless channels is performed considering all the wireless zones as candidates in the wireless base station, it is possible to enhance the utilization efficiency of the frequency by the processing diversified to the respective base stations.

In this second prior art system, however, when there are a plurality of candidate base stations that are possible to be connected, a wireless channel having the maximum receiving level among them is selected and, therefore, even a base station having a less number of idle channels, it is selected on priority basis if it has the maximum receiving level, and the base station in which traffics are concentrated is still likely to occur calling loss.

SUMMARY OF THE INVENTION

It is an object of the present invention to provide a wireless mobile telephone apparatus that can utilize the frequency more effectively than the prior art other zone selection system.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

A wireless mobile telephone apparatus according to a first aspect of the present invention operates as follows: when an origination signal is transmitted from a mobile station, the base station of a wireless zone where the mobile station is not present communicates a connection possible signal to the base station in the zone where the mobile station is present, and the base station having a larger number of idle channels than that of other base stations is selected on priority basis independent on the signal intensity.

A wireless mobile telephone apparatus according to a second aspect of the present invention operates as follows: when the mobile station has a receiving level larger than the required minimum receiving input level in a wireless zone where the mobile station is not present during the mobile station performing a communication, the base station of that wireless zone communicates a connection possible signal to the existing-in-zone base station, and if the receiving level in the base station in the other zones where the mobile station is not present is larger than the previously established threshold level, even when the receiving level of the existing-in-zone base station is larger than the required minimum receiving level, a base station in the non-existing zones having a larger number of idle channels is selected on priority basis.

In a wireless mobile telephonic apparatus according to a third aspect of the present invention, it is requested from the base station which is selected and started a communication with the mobile station to the non selected base stations to stop the transmission of the connection possible signal. Therefore, the connection possible signal is stopped to be continuously transmitted from the peripheral base stations after the base station is selected.

In a wireless mobile telephone apparatus according to a fourth aspect of the present invention, when the number of idle channels of the base station which is selected and continuing a communication with the mobile station is reduced to less than a prescribed value, it is requested for all the base stations which have a receiving level of the mobile station larger than the required minimum receiving level to retransmit the connection possible signal. Therefore, when the number of idle channels is reduced to less than the prescribed level, the retransmission of the connection possible signal is requested for all the base stations which are not selected.

A wireless mobile telephone apparatus according to a fifth aspect of the present invention, a data signal including the number of idle channels in addition to a connection possible signal is employed as a signal transmitted from the non existing-in-zone base station to the existing-in-zone base station.

BRIEF DESCRIPTION OF THE DRAWINGS

FIG. 7 is a diagram illustrating an operation sequence of the wireless mobile telephone apparatus according to the third embodiment of the present invention.

FIG. 19 is a diagram illustrating a signal format indicating a transmission message of the control channel from the base station to the moving channel.

FIG. 20 is a diagram illustrating a signal format indicating a transmission message of the communication channel from the base station to the mobile station.

DETAILED DESCRIPTION OF THE PREFERRED EMBODIMENT

Embodiment 1.

Figure 1A:
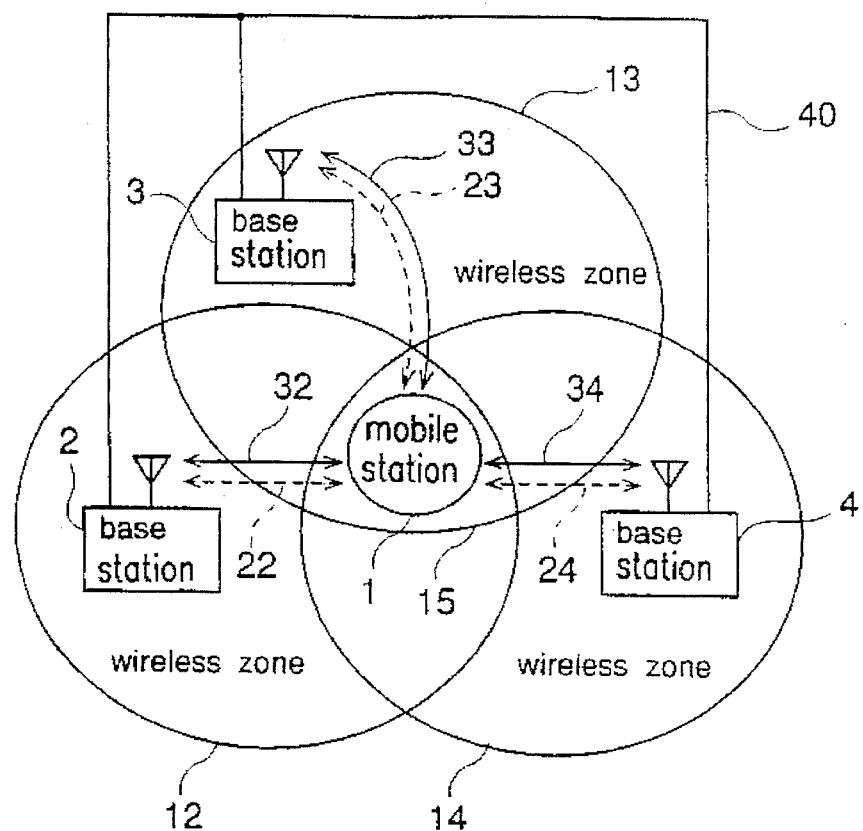
FIGS. 1(*a*) and 1(*b*) are diagrams illustrating a system construction of a wireless mobile telephone system and a construction of a base station thereof, respectively, according to a first embodiment of the present invention.
Figure 1B:
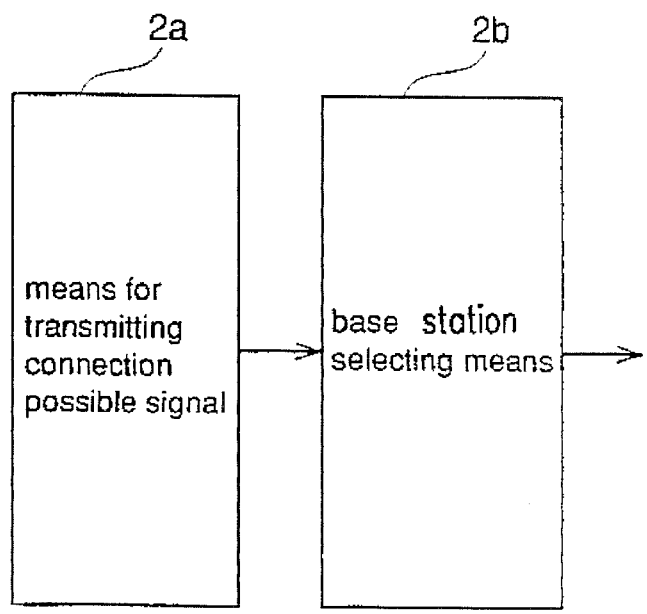
Figure 2:
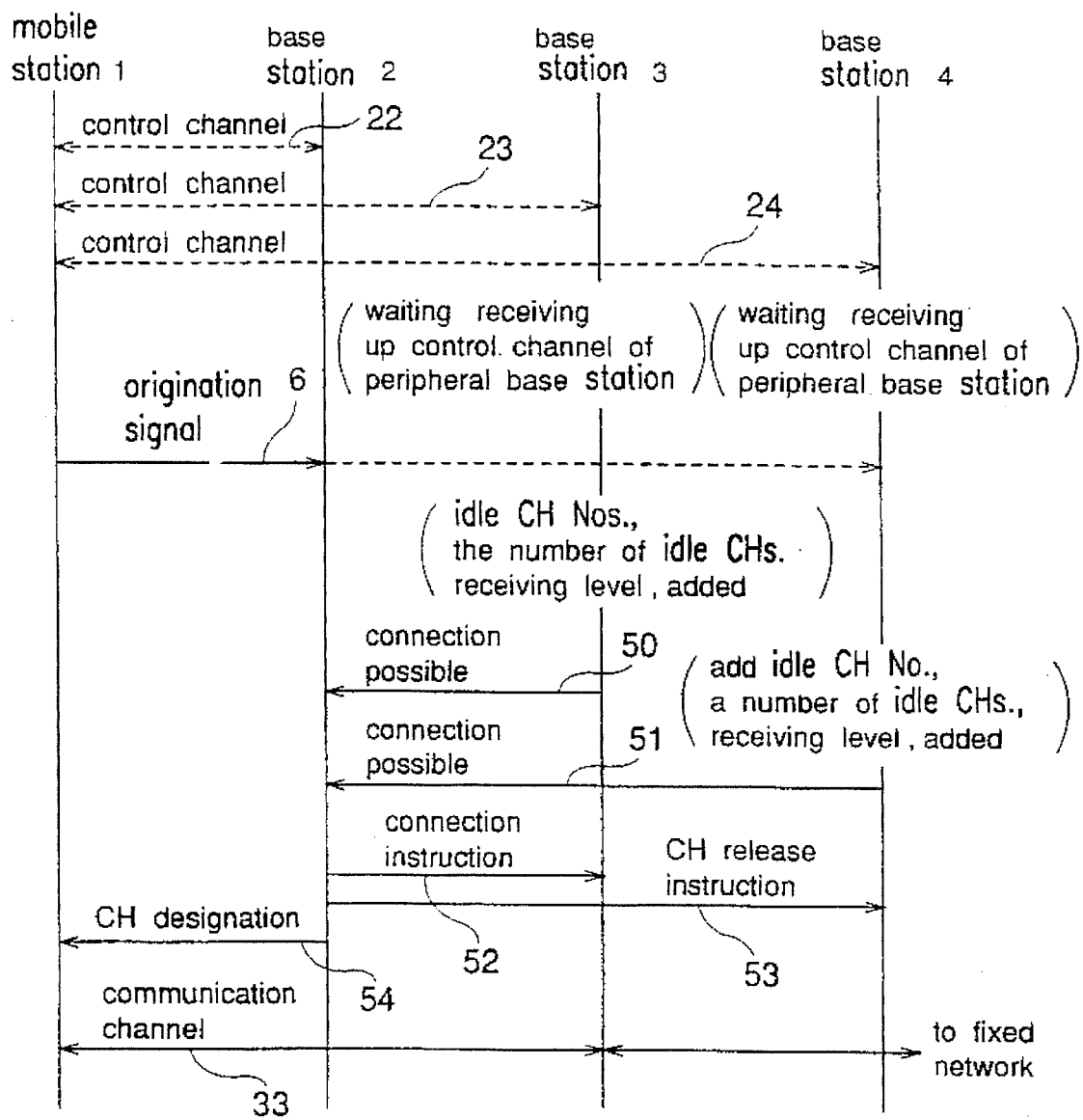
FIG. 2 is a diagram illustrating an operation sequence of the wireless mobile telephone system according to the first embodiment of the present invention.

FIG. 1 is a diagram illustrating a system construction of a wireless mobile telephone apparatus according to a first embodiment of the present invention and FIG. 2 is a diagram illustrating an operation sequence of the wireless mobile telephone apparatus of the first embodiment.

FIG. 1(a) shows a system construction of this first embodiment. In the figure, the same reference numerals as those in the prior art apparatus designate the same or corresponding elements. Reference numerals 22, 23, and 24 designate control channels through which respective base stations 2, 3, and 4 perform transfer of control signals with the moving terminal 1. Reference numerals 32, 33, and 34 designate voice channels which the respective base stations 2, 3, and 4 employ as communication paths with the mobile station 1. Reference numeral 40 designates a data line connecting the base stations 2, 3, and 4. Reference numerals 50, 51, 52, and 53 designate inter-terminal signals transferred by the respective terminals 2, 3, and 4 for assigning communication channels to the moving channel 1. Reference numeral 54 designates a channel designating signal transmitted from the base station 2 communicating the voice channel 33 to the moving channel 1 through the control channel 22.

FIG. 1(b) shows a means provided in the base station 2 for performing assignment control of the communication channel to the mobile station. In the figure, reference numeral 2a designates a connection possible signal transmitting means for transmitting a connection possible signal from a base station in the zone of which the moving terminal does not exist (hereinafter referred to as non existing-in-zone) base station to the base station in the zone of which the mobile station is present (hereinafter referred to as existing-in-zone base station) when the non existing-in-zone base station receives a connection request signal from the mobile station at the start of telephonic communication. Reference numeral 2b designates a base station selecting means for selecting, when the existing-in-zone base station receives the origination signal from the mobile station, a base station having a receiving level larger than a required minimum receiving level as the receiving level of the mobile station and having the maximum number of possessing idle channels among all the other base stations transmitting the connection possible signal and the existing-in-zone base station. Here, the connection possible signal transmitting means and the base station selecting means are also provided in the other base stations 3 and 4.

A description is given of an operation from waiting a communication up to assigning a wireless channel in response to an origination signal will be described with reference to FIG. 2.

First of all, during waiting a communication, assuming that the mobile station 1 is present in the wireless zone 12, it receives a control signal 22 from the wireless base station 2. When a calling or a receiving calling occurs at the mobile station 1, the mobile station 1 transmits an origination signal 6. In this embodiment, since the mobile station 1 is present in the overlapping zone 15, this origination signal 6 is received not only by the base station 2 producing the zone in which the mobile station 1 is present but by the stations 3, 4 waiting up control channels previously assigned to peripheral channels. When the base stations 3, 4 have idle channels, it communicates to the base station that the origination signal 6 is received by the connection possible signal 50, 51 with the idle channel Nos. the number of idle channels, and the receiving level. The base station 2 compares the number of idle channels and the receiving levels of the self and the other base stations 3 and 4, and selects the base station having a receiving input larger than the required minimum receiving level and having the maximum number of idle channels.

In this embodiment, when the base station 3 is supposed to be selected, the base station 2 transmits the connection instruction 52 to the base station 3, transmits a channel relating instruction 53 to the base station 4 and starts the setting of the communication channel 33 by transmitting the channel designation 54 to the mobile station 1.

Figure 3:
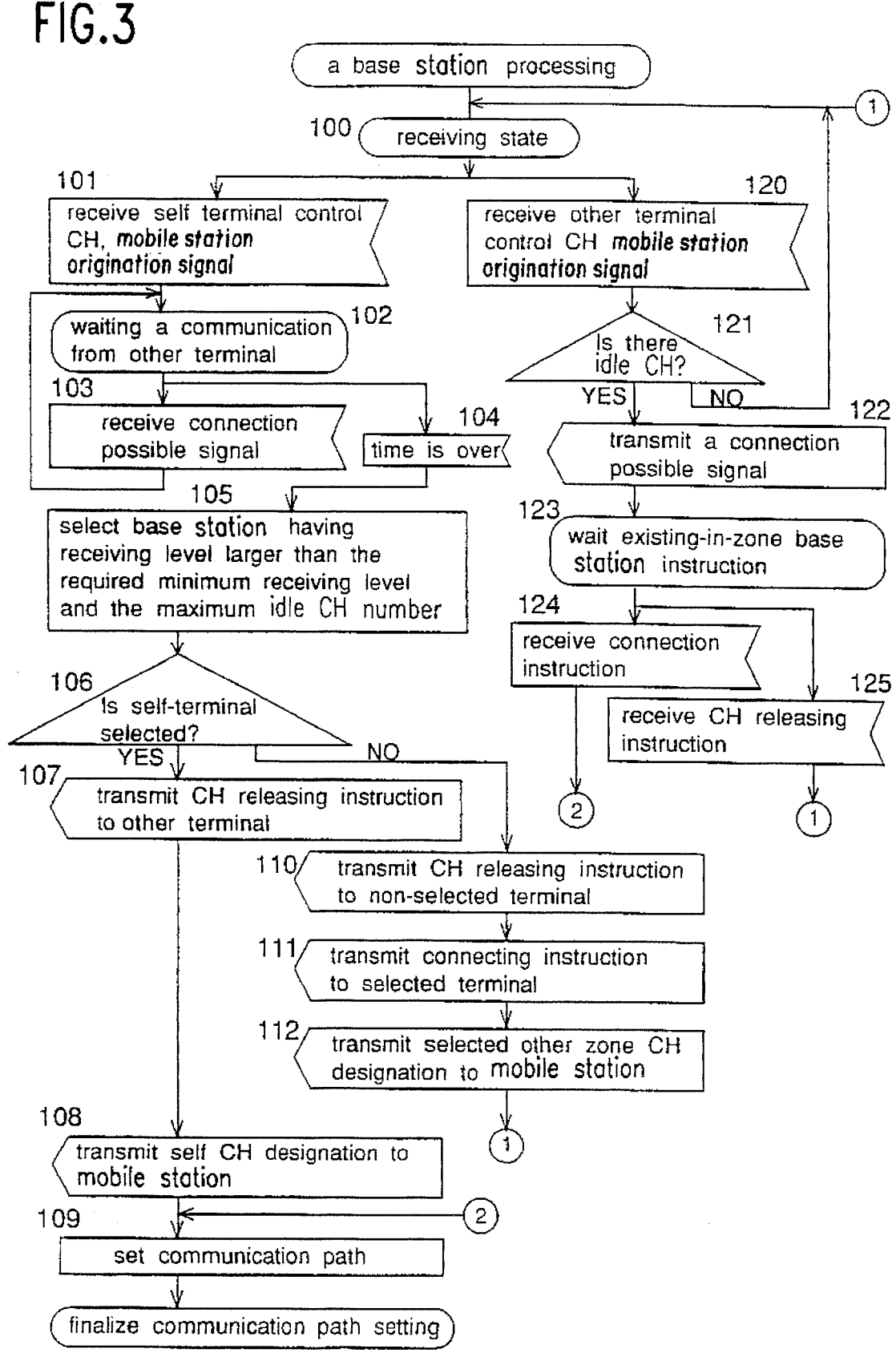
FIG. 3 is a diagram illustrating an operation flowchart up to setting a communication path of the wireless mobile telephone apparatus according to the first embodiment of the present invention.

FIG. 3 shows a flowchart up to setting a communication path according to a first embodiment of the present invention. The mobile station performs not only waiting of a self control channel but waiting of an up control channel of the peripheral base station by changing the frequency of the idle channel. Then, when the base station receives an origination signal from the mobile station through the self control channel (step 101), it waits for a prescribed time the existence of the connection possible signal from peripheral base stations (step 102). When it receives the connection possible signal from the other station (step 103) and a prescribed time passes (step 104), it selects a base station having a level larger than the required minimum receiving level and the largest number of idle channels among the base stations which received the connection possible signal and the self base station (step 105). When the selected base station is the self terminal (step 106), it transmits a channel releasing instruction to all the base stations which have transmitted the connection possible signal (step 107), and transmits a channel designating signal indicating the voice channel of the self terminal to the mobile station (step 108) and, thereafter, it sets the communication path (step 109).

In addition, when it selects the other zone at step 105 (NO at step 106), it transmits a channel releasing instruction to non-selected terminal among the base stations which have transmitted the connection possible signal (step 110), it transmits a connection instruction to the selected terminal (step 111), it transmits a channel designating signal indicating a communication channel of a selected terminal to the mobile station (step 112), and it returns a receiving state (step 100).

On the other hand, when the base station receives an origination signal from the mobile station through the other control channel (step 120) in the waiting state (step 100), when there is an idle channel (step 121), it transmits a connection possible signal to the existing-in-zone base station (step 122), and receives an instruction from the existing-in-zone base station (step 123). When it receives an origination signal (step 120), if it does not have an idle channel (step 121), it returns again to the waiting state (step 100). When it receives a connection instruction (step 124) in a state waiting an existing-in-zone base station instruction (step 124), it sets a communication path (step 109). When it receives a channel releasing instruction (step 125) in a state waiting an existing-in-zone base station instruction (step 123), it returns to the waiting state (step 100).

In this way, in the above-described embodiment, when an origination signal is transmitted from the mobile station in the overlapping zone, a channel in the wireless zone having a larger number of idle channels is assigned on priority basis and, therefore, even for a wireless zone in which traffics are concentrated, the origination loss rate can be reduced relative to the prior art system.

In addition, since in the above-described embodiment a data signal including the number of possessing vacant channels is employed as the connection possible signal, it is possible to obviously know which base station has the maximum idle channel number and therefore, the base station having the maximum margin of idle channels can be easily selected.

Embodiment 2.

In the above-described embodiment the other zone selection is performed when a connection is requested from the mobile station 1. However, the zone selection can be performed also after the channel is switched during communication, i.e., after the communication channel is set.

Figure 4:
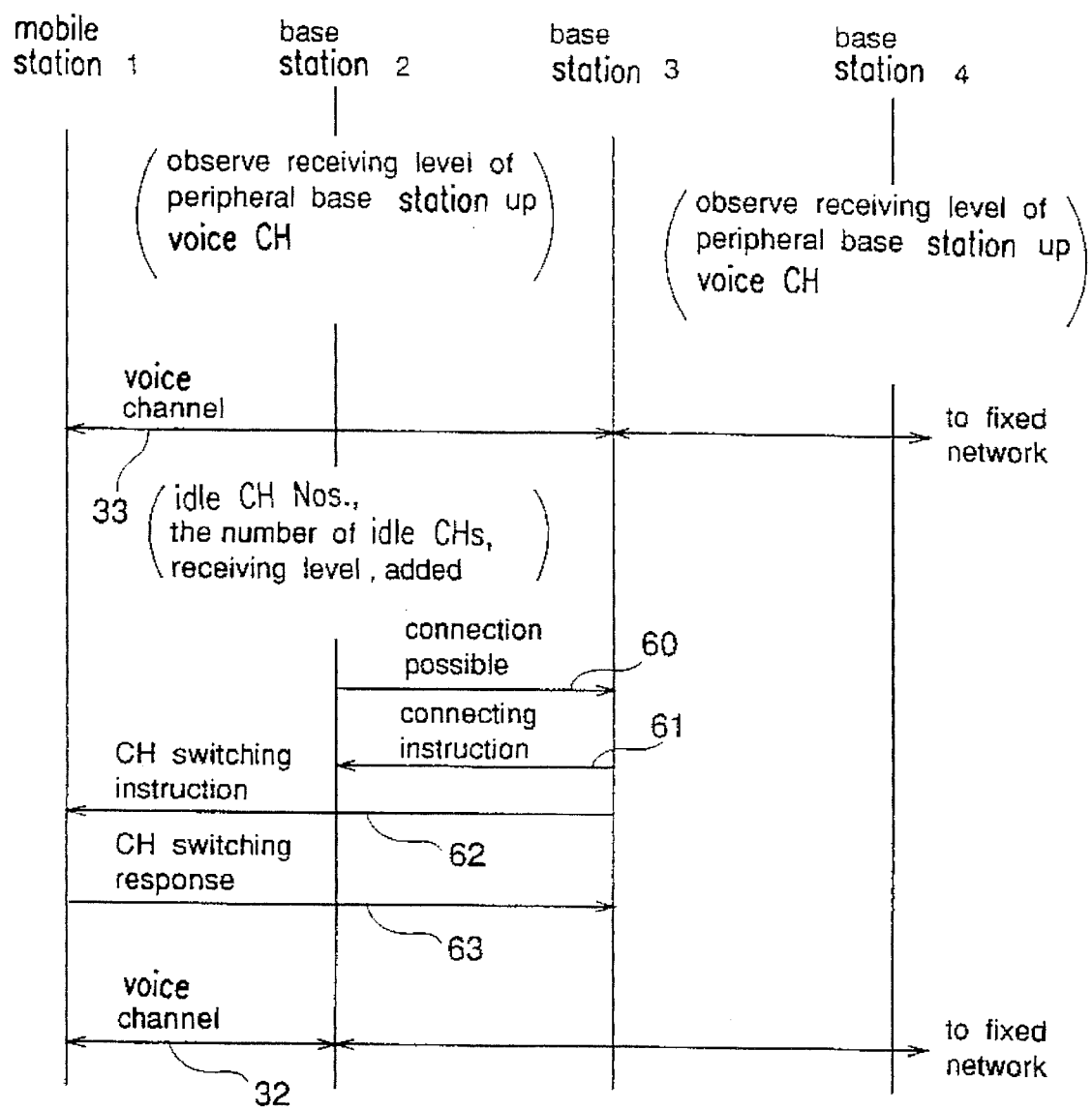
FIG. 4 is a diagram illustrating an operation sequence of a wireless mobile telephone apparatus according to a second embodiment of the present invention.

FIG. 4 is a diagram illustrating an operation sequence of a wireless mobile telephone system according to a second embodiment of the present invention which performs the other zone selection after setting the communication path. First of all, a communication path is set between the base station 3 and the mobile station 1 and between the base station 3 and a fixed network such as a public telephone exchange network. The base station 2 observes the receiving level of the up voice channels of peripheral base stations before the communication path is set, and if there is found an idle channel in the base station 2 in this state, the base station 2 communicates the idle channel No(s), the number of idle channels, and the receiving level with the connection possible signal 60 to the base station 3. The base station 3 compares the numbers of idle channels and the receiving levels of the self system and the base station 2, and it selects the base station having the receiving input larger than the required minimum receiving level and the maximum number of idle channels.

In this embodiment, while the receiving levels of the base stations 2,3 change in accordance with the movement of the mobile station as well as the idle channel changes with time, when the base station 2 is selected, the base station 2 transmits the connection possible signal 60 to the base station 3, and transmits the connection instruction 61 to the mobile station 1 to start setting of the voice channel 32.

Figure 5:
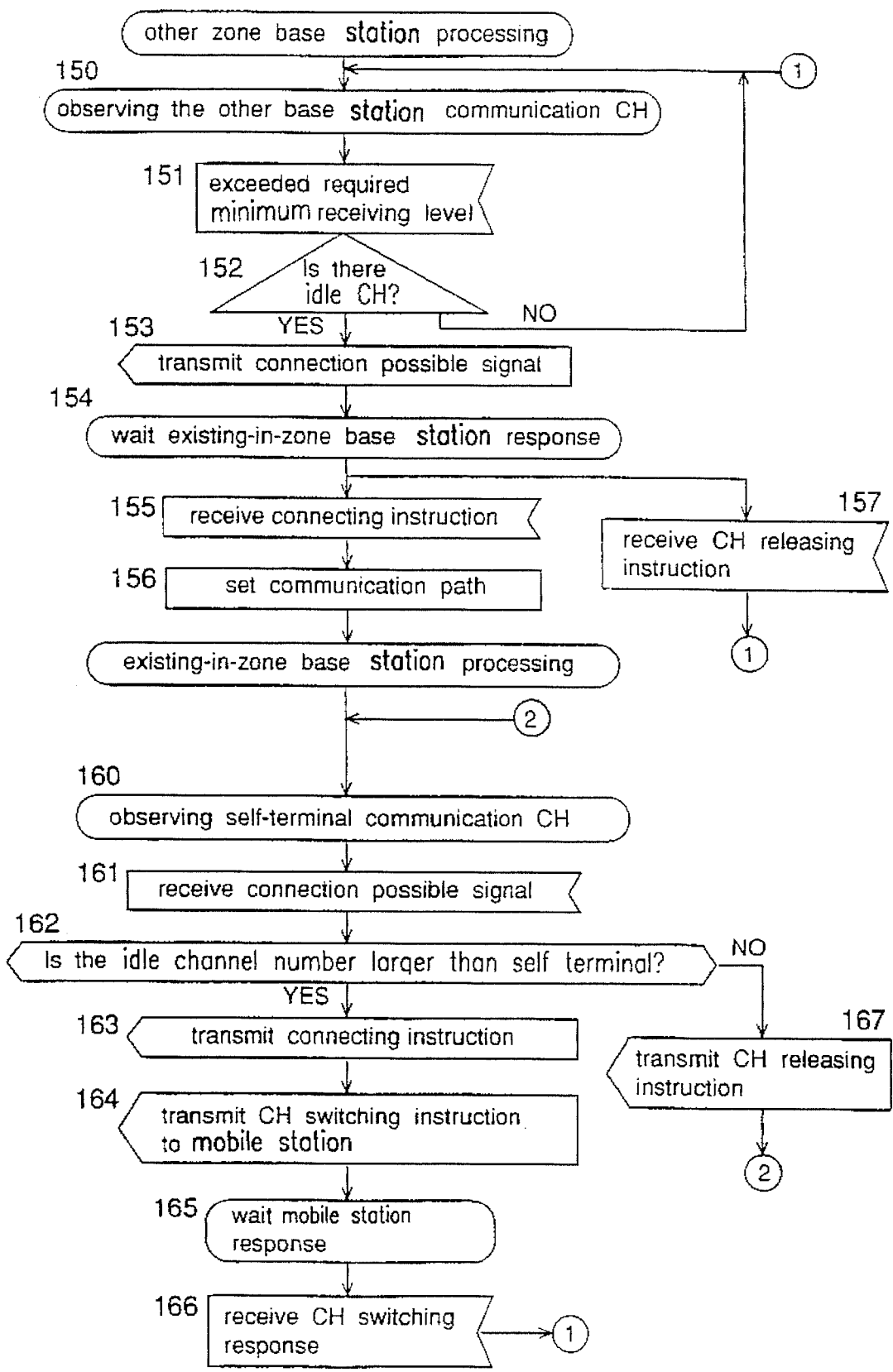
FIG. 5 is a flowchart of the wireless mobile telephone apparatus according to the second embodiment of the present invention.

FIG. 5 is a diagram illustrating a flowchart setting the telephonic communication path of the above-described embodiment. The base station (for example, 4 in FIG. 1) of the other zone (4) changes the set frequency of the idle channel or the usage channel of the terminal itself to the other base station voice channel for an instance to observe the receiving level of the up voice channel of the peripheral base stations (base station 2 or others). When the base station detects that the receiving level exceeds the required minimum receiving level (step 151), if it has an idle channel (step 152), it communicates the connection possible signal with the idle channel No., the number of idle channels, and the receiving level to the existing-in-zone base station (step 153) and, thereafter, it enters a state of waiting a response from the existing-in-zone base station (step 154). When it receives the connection instruction from the existing-in-zone base station (step 155), it sets a telephonic communication path (step 156), and it enters a state of observing the self voice channel (step 160). In addition, when it receives a channel releasing instruction from the existing-in-zone base station (step 160), it returns to the state of observing the other voice channel (step 150).

On the other hand, in a state where the existing-in-zone base station observes the self voice channel (step 160), when it receives a connection possible signal from the other terminal (step 162), it starts a sequence of channel switching.

In other words, after the base station transmits a connection instruction to the selected terminal (step 163), it transmits a channel designating signal designating a voice channel of the selected terminal to the mobile station (step 164), it enters a state of waiting a response from the mobile station (step 165), and when the base station receives the channel switching response (step 166), it returns to the state of observing the other terminal voice channel (step 162). When the number of idle channels is less than that of the self terminal (step 162), it transmits a channel releasing instruction (step 167), and it returns to the state of observing the self terminal voice channel (step 160).

In this way, in the above-described embodiment, even during when the mobile station performs a telephonic communication in the overlapping zone, a channel in the wireless zone the base station of which has a larger number of idle channels is assigned on priority basis and, therefore, the calling loss can be reduced relative to the conventional system even in the wireless zone in which traffics are concentrated.

Embodiment 3.

Further, the selected base station may request that the other base station stop sending the connection possible signal.

Figure 6A:
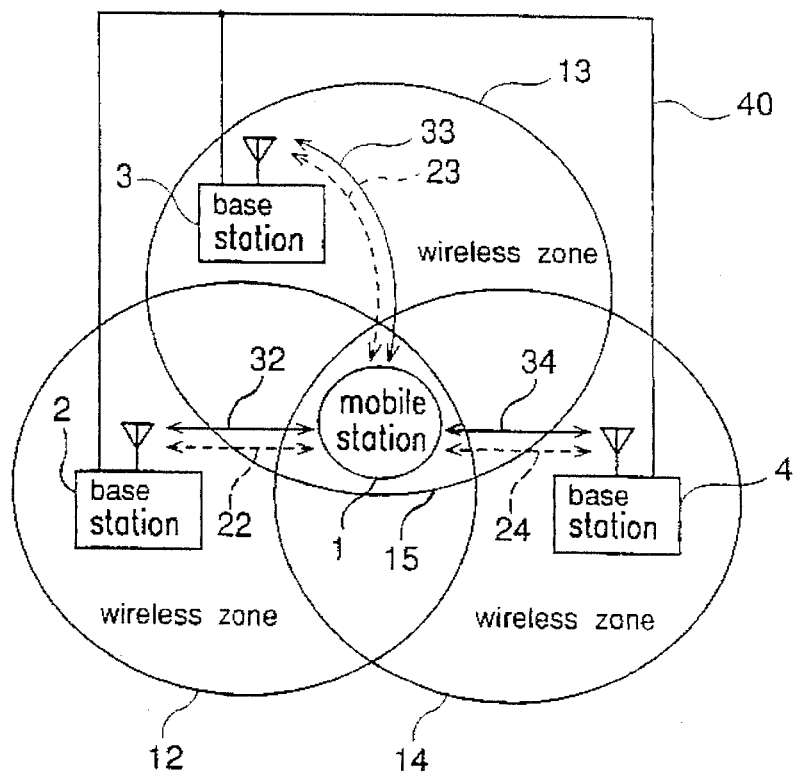
FIGS. 6(a) and 6(b) are diagrams illustrating a system construction of a wireless mobile telephone apparatus and a construction of a base station thereof, respectively, according to a third embodiment of the present invention.
Figure 6B:
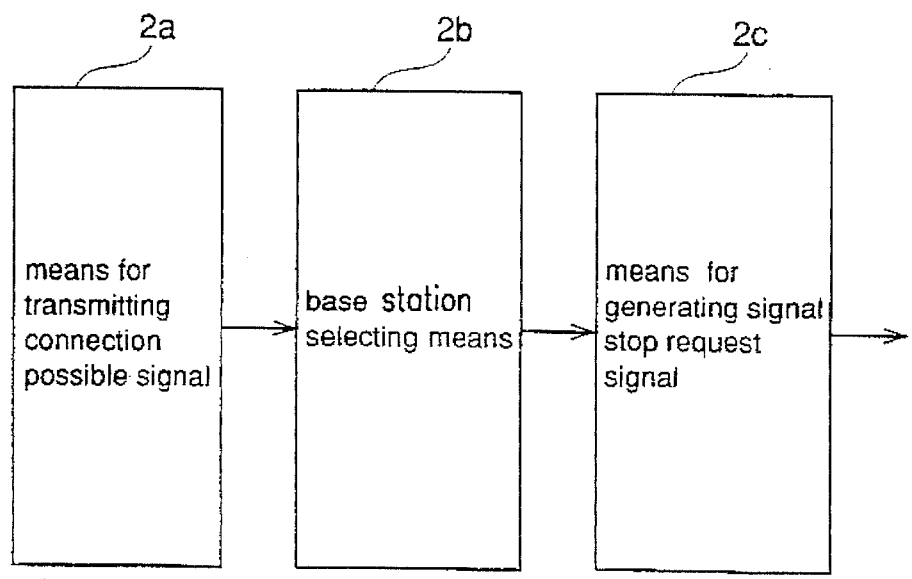
Figure 8:
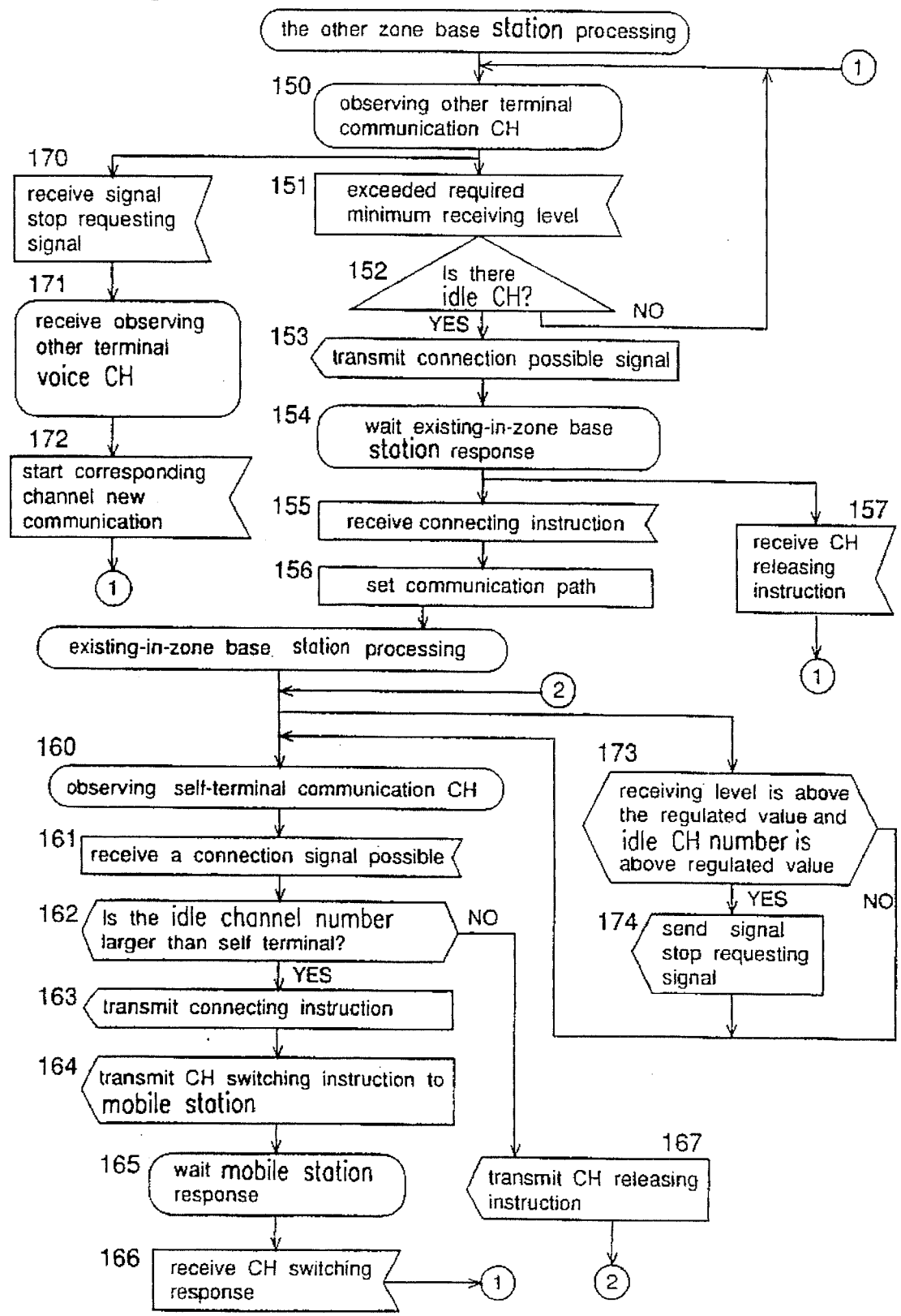
FIG. 8 is a diagram illustrating an operation flowchart of the wireless mobile telephone apparatus according to the third embodiment of the present invention.

FIG. 6 is a diagram illustrating a system construction of a third embodiment of the present invention which requests stopping transmission of the connection possible signal after the base station is selected. FIG. 7 illustrates a sequence of the above-described embodiment and FIG. 8 illustrates a flowchart of the embodiment.

FIG. 6(*a*) shows a system construction of this third embodiment, which is the same as that shown in FIG. 1(*a*).

FIG. 6(*b*) shows a means provided in the base station 2 to control assignment of a voice channel to the mobile station. In the figure, reference numeral 2*a* designates a connection possible signal transmitting means for transmitting a connection possible signal to the existing-in-zone base station from the base station having no mobile station present in its zone when it receives the origination signal from the mobile station at the start of the telephonic communication. Reference numeral 2*b* designates a base station selecting means for selecting from the mobile station a base station having a receiving level larger than the required minimum receiving level and having the maximum number of idle channels among all the other base stations transmitting the connection possible signal and the existing-in-zone base station when the existing-in-zone base station transmits the origination signal from the mobile station. Reference numeral 2*c* designates a signal stop request signal transmitting means for transmitting a signal stop request signal that is sent out from the base station which is not selected and started the communication with the mobile station to the non-selected base station and requesting that non-selected base station stops the transmission of the connection possible signal to the selected base station. Heretofore, this connection possible signal transmitting means, the base station selecting means, and the signal stop request signal transmitting means are provided also in the other base stations 3 and 4.

FIG. 7 shows an operation sequence of this third embodiment performing the other zone selection after setting the communication path. First of all, suppose that a telephonic communication path is set between the base station 3 and the mobile station 3 and between the base station 3 and the fixed network. When this telephonic communication path is set, the base station 3 transmits the signal stopping request signal 64 to the base station 2 and the base station 4, requesting that the base station 2 and the base station 4 stop transmitting the connection possible signal.

Before this telephonic communication path is set, the base station 2 observes the receiving level of the up voice channels of the peripheral base stations and if the base station 2 has an idle channel in this state, it communicates the idle channel Nos., the number of idle channels, and the receiving level with the connection possible signal 60 to the base station 3. The base station 3 compares the numbers of idle channels and the receiving levels of the self terminal and the base station 2, and it selects the base station having the receiving input larger than the required minimum receiving level and the maximum number of idle channels.

In this embodiment, when it is supposed that the base station 2 is selected with the movement of the mobile station and the change of the idle channels with the passage of time, the base station 2 transmits the connection possible signal 60 to the base station 3 and also transmits the connection instruction 61 to the mobile station 1 to start setting the voice channel 32.

FIG. 8 shows a flowchart up to setting the voice channel of the above-described embodiment. The base station (4) of the other zone (4), in its other terminal voice channel observing state (step 150), changes the frequency setting of the idle channel or the usage channel to the other voice channel for an instance and observes the receiving level of the up voice channel of the peripheral base stations. When it detects that the receiving level having exceeded the required minimum receiving level (step 151), when there is an idle channel (step 152), it communicates the connection possible signal with the idle channel No., the number of idle channels, and the receiving level to the zone existing-in-zone base station (step 153) and, thereafter, it enters a state of waiting a response from the existing-in-zone base station (step 154). When it receives the connection instruction from the existing-in-zone base station (step 155), it sets a communication path (step 156). The operation up to this is the same as that of FIG. 5.

Here, if the receiving level is larger than the prescribed value and the number of idle channels is larger than the prescribed value (step 173), it transmits a signal stopping request signal (step 174), and it enters a state of observing the self terminal voice channel (step 160). In addition, when it receives a channel releasing instruction from the existing-in-zone base station (step 157), it returns to the state of observing the other terminal voice channel (step 150).

On the other hand, when the existing-in-zone base station which has performed existing-in-zone base station processing receives, in its state of observing the self terminal voice channel (step 160), a connection possible signal from the other terminal (step 161), when the number of idle channels is larger than that of the self terminal (step 162), it starts a sequence of channel switching.

In addition, when the terminal receives the signal stopping request signal (step 170) in its state of observing the other terminal voice channel (step 150), it becomes a state of reserving observation of the other terminal voice channel (step 171), and when a new telephonic communication is stated through that channel (step 172), it returns to a state of observing the other voice channel (step 180).

In this embodiment, the selected base station requests the other base station to stop transmitting the connection possible signal and, therefore, even after one base station is selected, the connection possible signal is continued to be transmitted from the peripheral base stations, and it is possible to prevent that an extra work load to respective base stations increase, thereby arising a delay in the exchange control.

While this embodiment is applied to a system in which after setting the telephonic communication path, a base station having the maximum idle channel number is selected as in the third embodiment, it may be applied to a system which selects the base station having the maximum number of idle channels before setting a voice channel.

Embodiment 4.

Further, when the number of idle channels of the selected base station becomes below a prescribed value, it may transmit a signal requesting a retransmission of a connection possible signal to all the base stations which are not selected.

Figure 10:
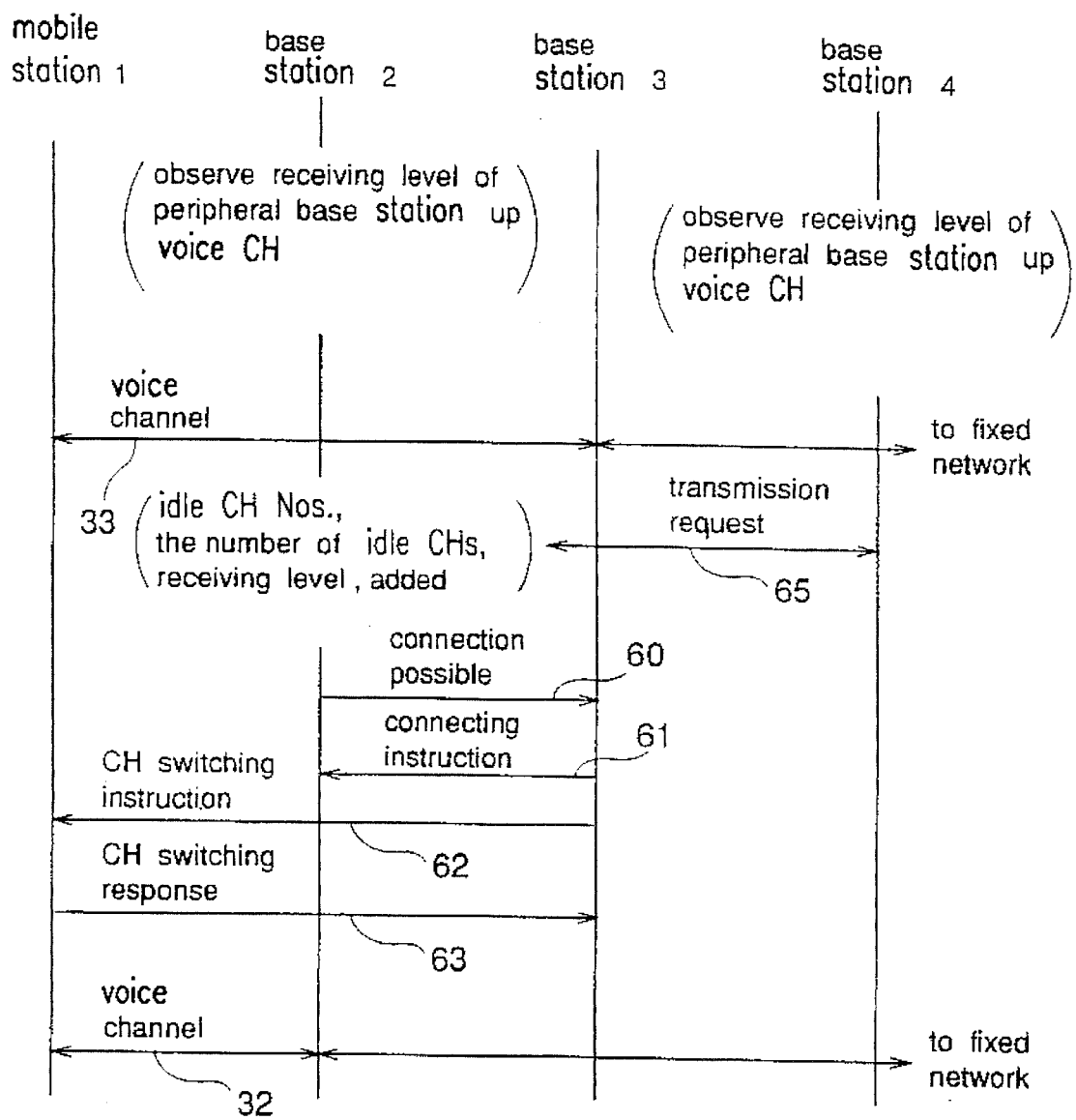
FIG. 10 is a diagram illustrating an operation sequence according to a wireless mobile telephone apparatus according to a fourth embodiment of the present invention.
Figure 11:
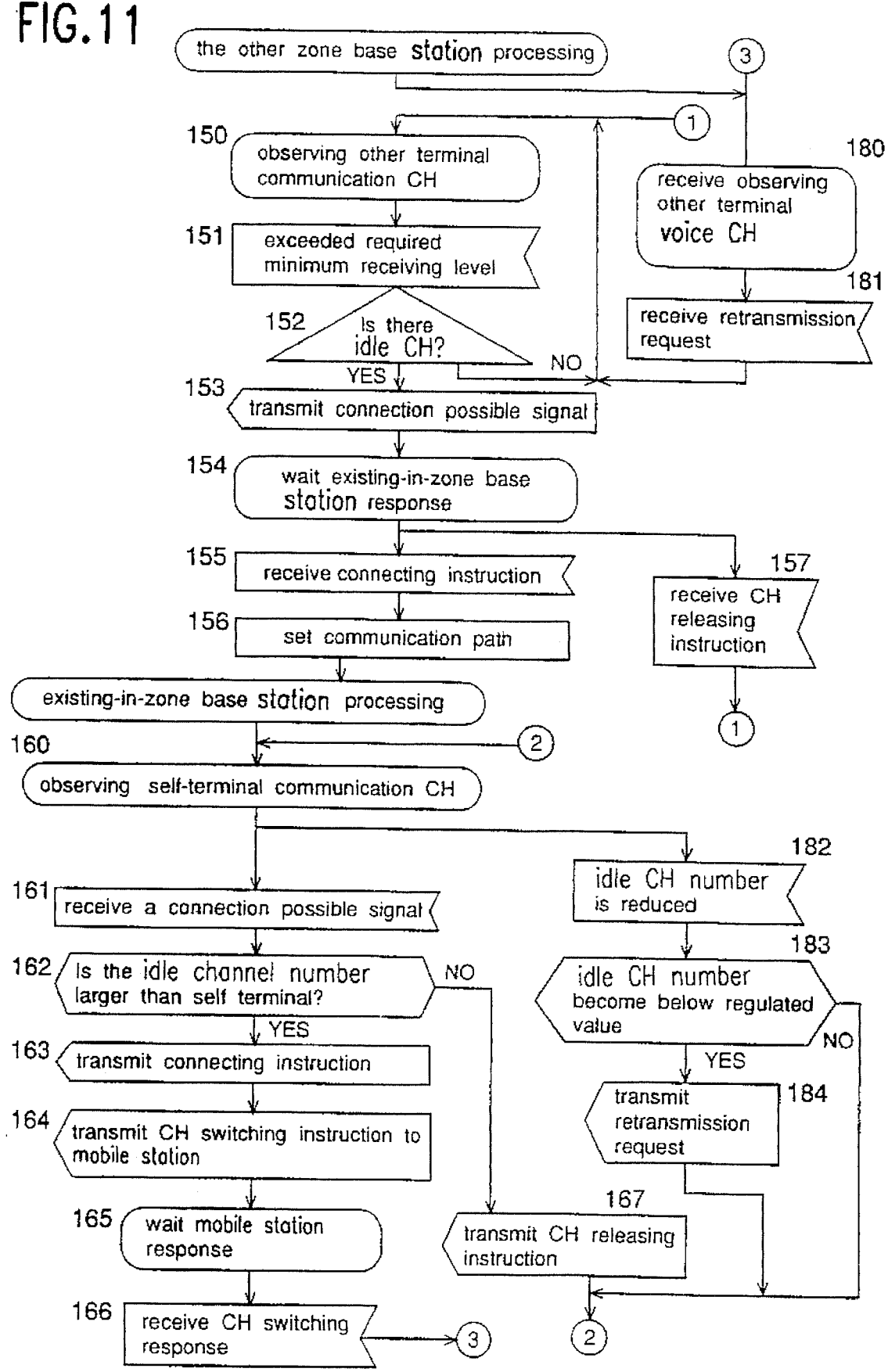
FIG. 11 is a diagram illustrating an operation flowchart of the wireless mobile telephone apparatus according to the fourth embodiment of the present invention.
Figure 12:
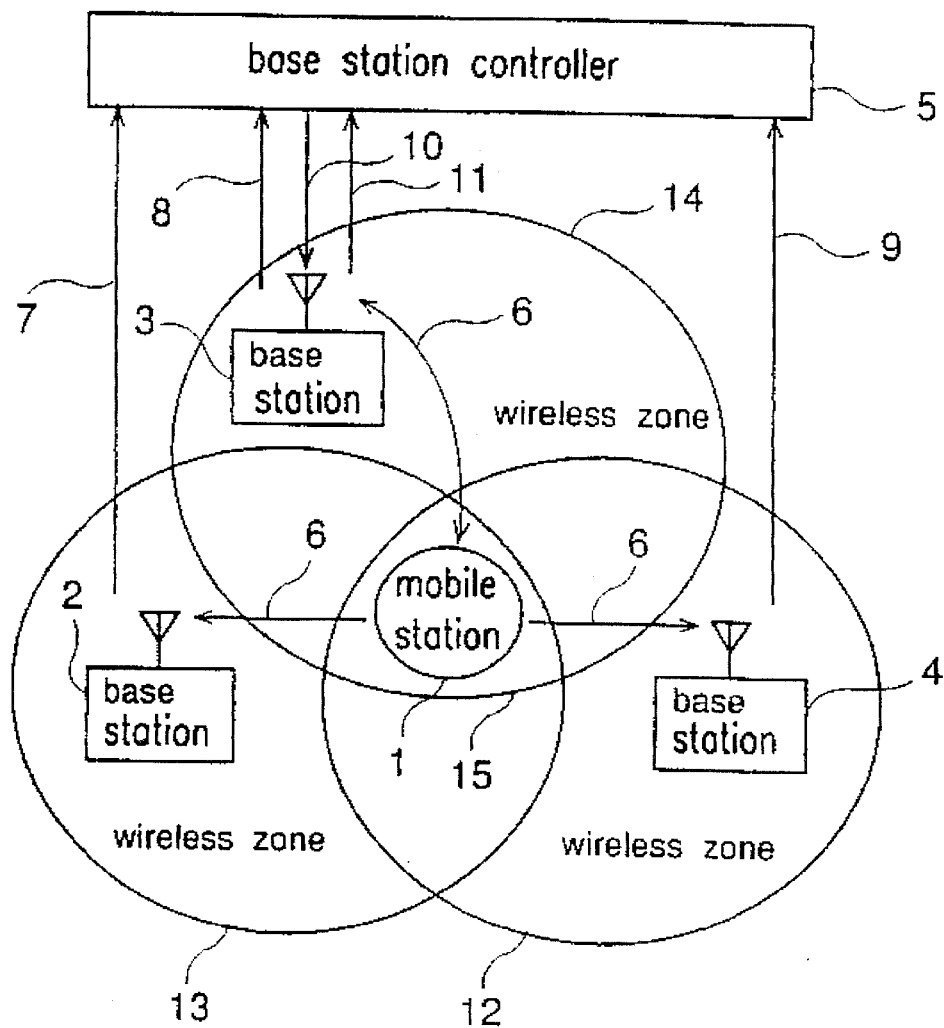
FIG. 12 is a diagram illustrating a system construction of a wireless mobile telephone apparatus performing the other zone selection according to the prior art system.
Figure 13:
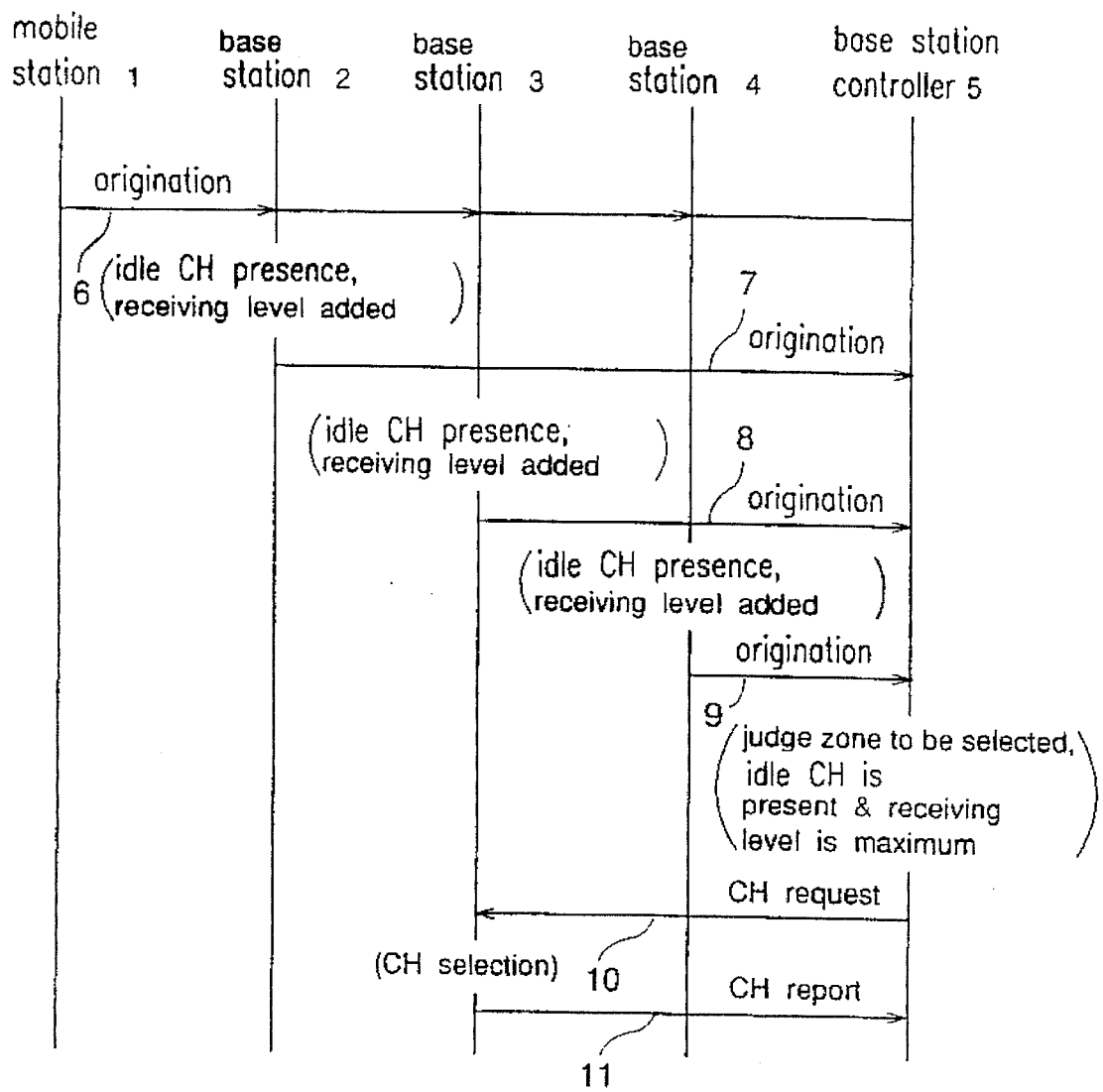
FIG. 13 is a sequence of the wireless mobile telephone apparatus performing the other zone selection according to the prior art system.
Figure 14:
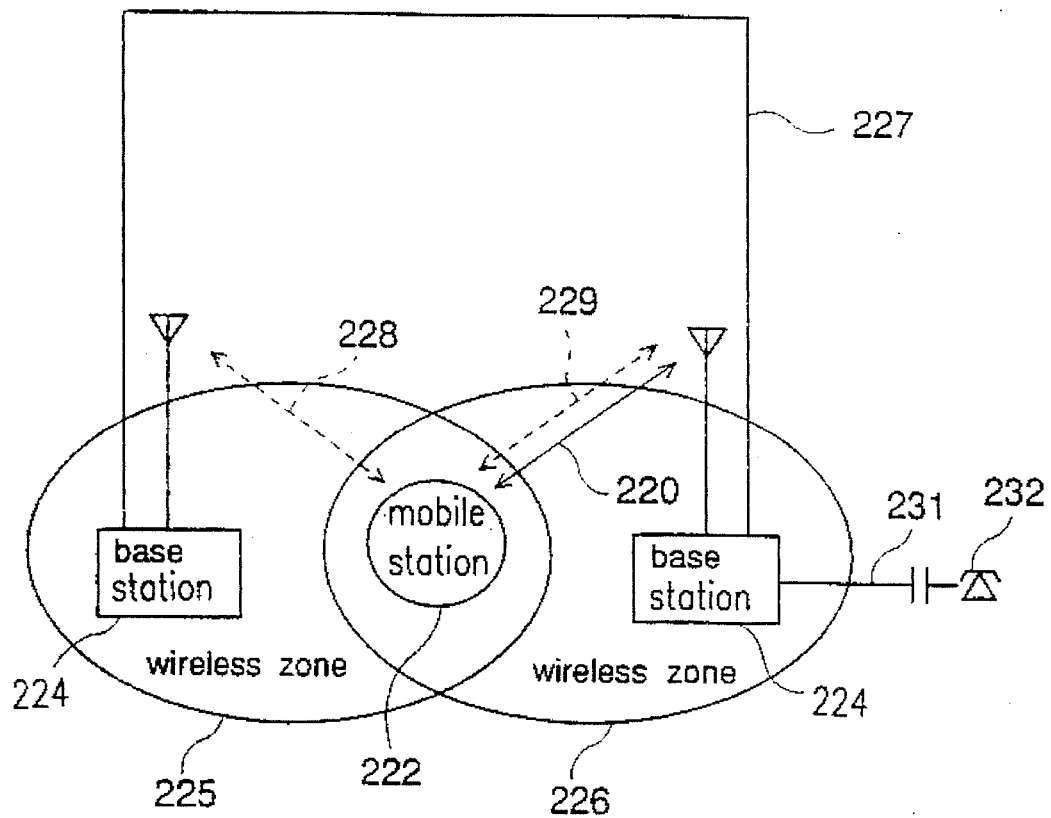
FIG. 14 is a system construction of the other moving wireless mobile telephone apparatus performing the other zone selection according to the prior art system.
Figure 15:
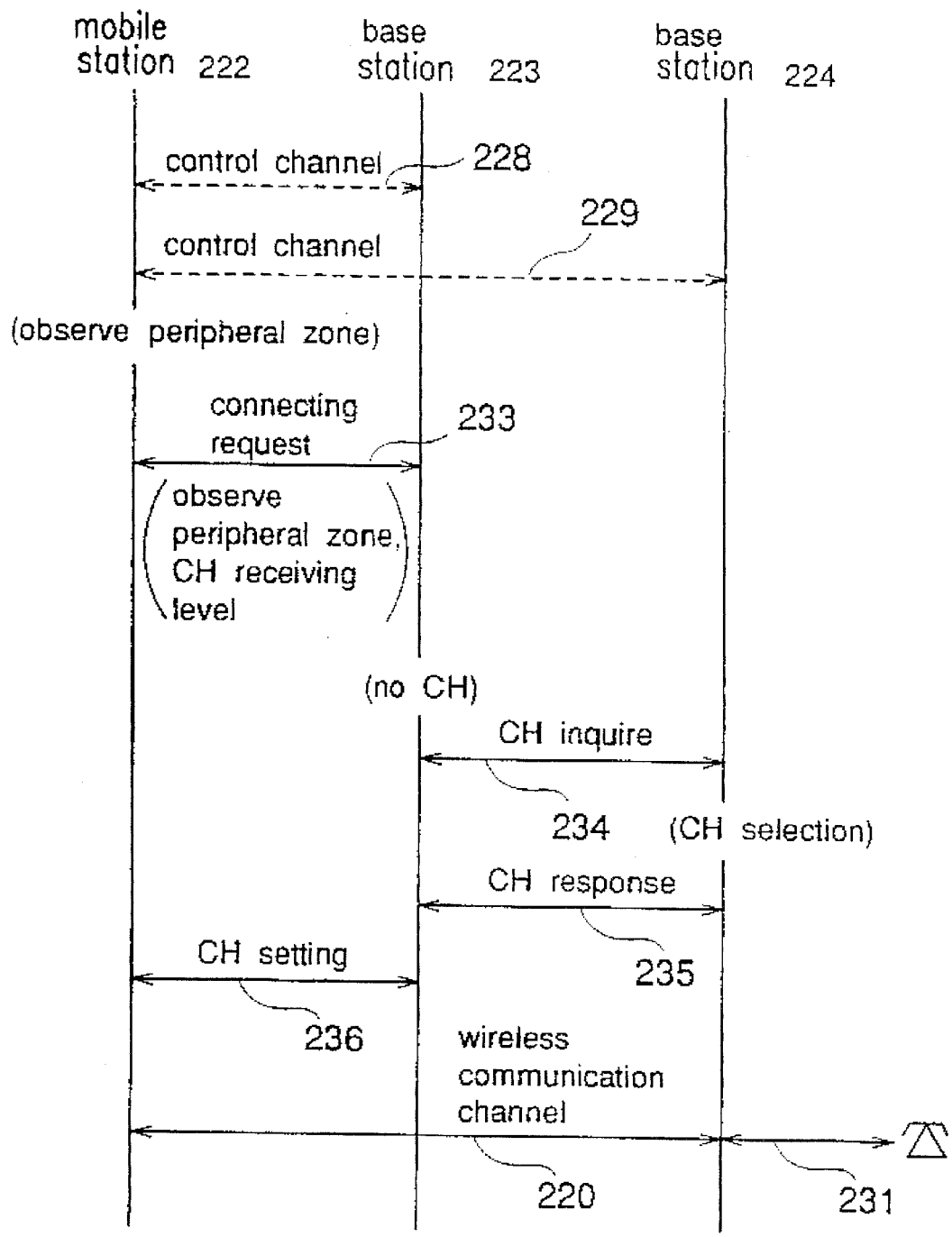
FIG. 15 is a diagram illustrating an operation sequence of the wireless mobile telephone apparatus performing the other zone selection according to the prior art system.
Figure 16:
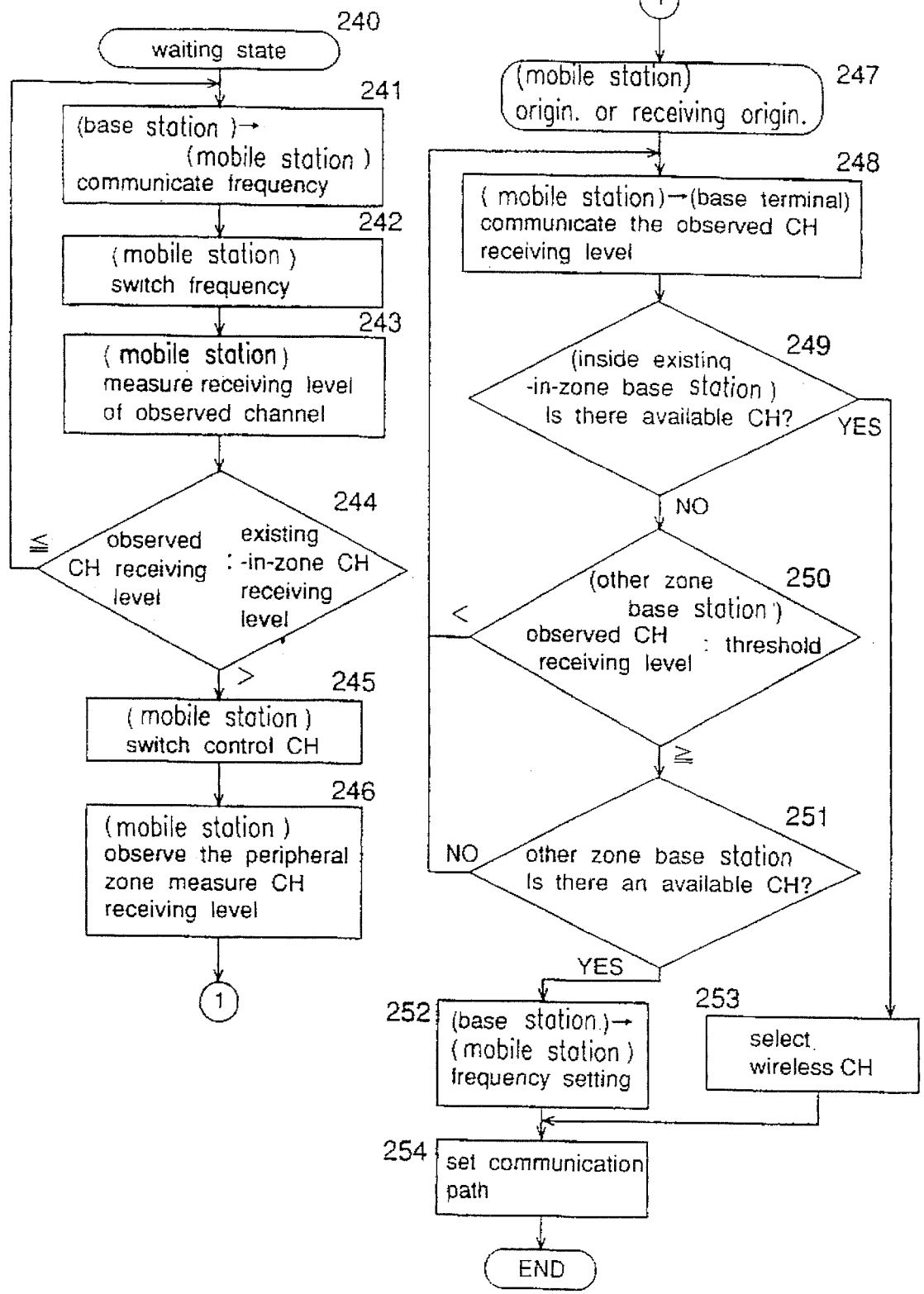
FIG. 16 is a diagram illustrating an operation flowchart of the wireless mobile telephone apparatus performing the other zone selection according to the prior art system.
Figure 17:
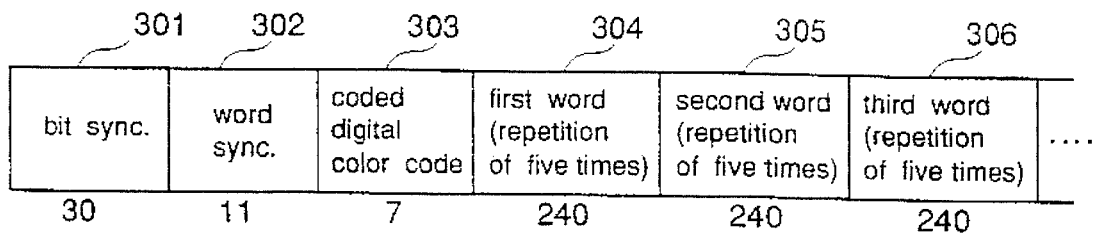
FIG. 17 is a diagram illustrating a signal format indicating a transmission message of a control channel from the mobile station to the base station.
Figure 18:
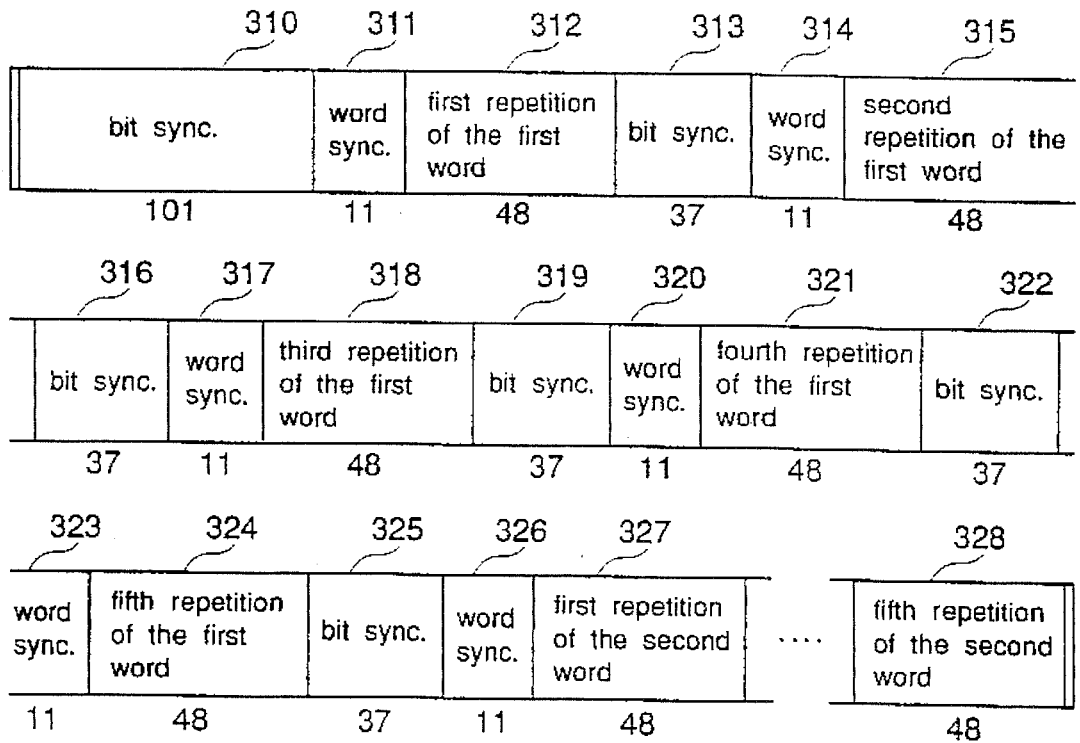
FIG. 18 is a diagram illustrating a signal format indicating a transmission message of a communication channel from the mobile station to the base station.

FIG. 9 illustrates a system construction of a fourth embodiment of the present invention which requires a retransmission of a connection possible signal to all the base stations which are not selected after the selection of the base station. FIG. 10 shows an operation sequence of the above-described embodiment and FIG. 11 shows an operation flowchart of the above-described embodiment.

Figure 9A:
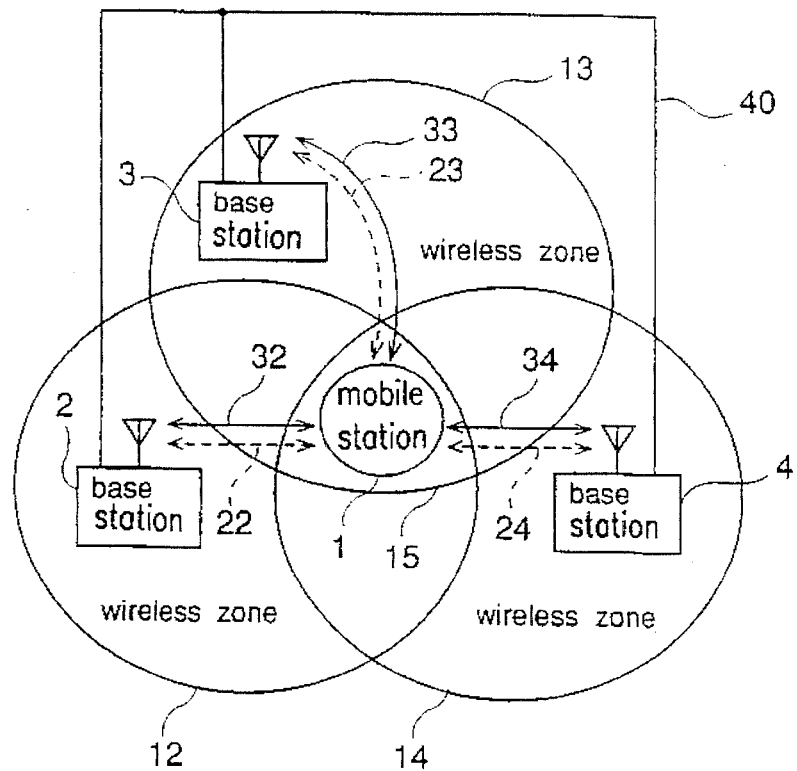
FIGS. 9(a) and 9(b) are diagrams illustrating a system construction of a wireless mobile telephone apparatus and a construction of a base station thereof, respectively, according to a fourth embodiment of the present invention.

FIG. 9(a) shows a system construction of this embodiment and this is the same as that shown in FIG. 1(a) and FIG. 6(a), respectively.

Figure 9B:
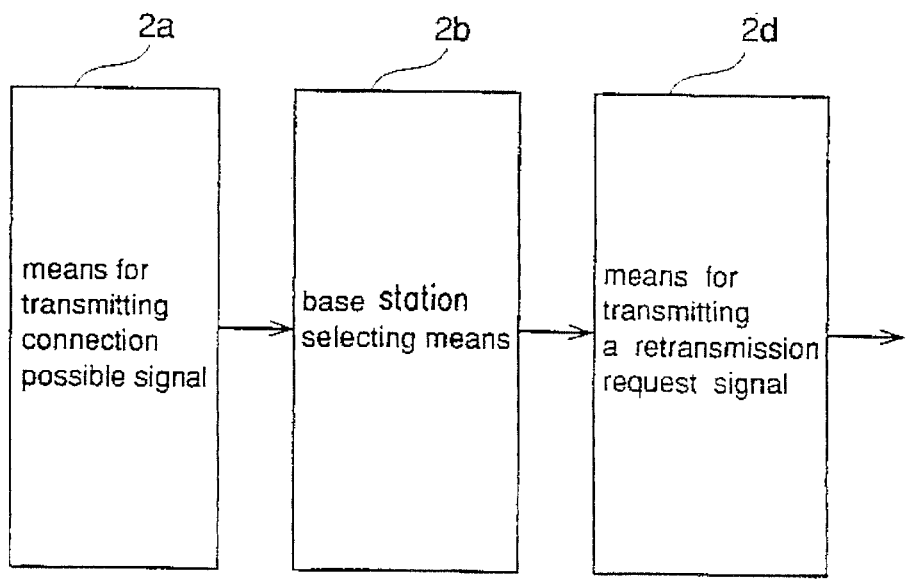

FIG. 9(b) shows a means provided for controlling assignment of the voice channel to the mobile station. Reference numeral 2a designates a connection possible signal transmitting means for transmitting a connection possible signal to the existing-in-zone base station from the base station in the zone in which the mobile station is not present when it receives a connection possible signal from the mobile station at the start of the telephonic communication, reference numeral 2b designates a base station selecting means for selecting the base station having the receiving level of the mobile station larger than the required minimum receiving level and the maximum number of possessing idle channels among all the base stations transmitting the above-described connection possible signal and the existing-in-zone base station when the existing-in-zone base station receives the origination signal of the mobile station. Reference numeral 2d designates a retransmission request signal transmitting means for transmitting a retransmission request signal requesting retransmitting the connection possible signal to all the base stations receiving the signal of the mobile station at a level larger than a prescribed level when the number of idle channels of the base station which is selected and performing a communication with the mobile station becomes below a prescribed level. Here, the origination possible signal transmitting means, the base station selecting means, and the retransmission request signal transmitting means are provided also in the other base stations 3, 4.

FIG. 10 is a diagram illustrating an operation sequence of the fourth embodiment of the present invention requesting retransmission of a connection possible signal to all the base stations which are not selected after a base station is selected. First of all, suppose that a telephonic communication path is set between the base station 3 and the mobile station 1 and between the base station 3 and fixed network. When this telephonic communication path is set, the base station 3 transmits the retransmission request signal 65 to the base station 2 and the base station 4 and request that the base station 2 and the base station 4 retransmit the connection possible signal.

Before this telephonic communication path is set, the base station 2 observes the receiving level of the telephonic communication path, and in this state, if there is an idle channel in the base station 2, it transmits the idle channel No., the number of idle channels, and the receiving level by the connection possible signal 60 to the base station 3. The base station 3 compares the numbers of idle channels and the receiving levels of the self terminal and the base station 2, and selects a base station having a receiving input larger than the required minimum receiving level and the maximum number of idle channels.

In this embodiment, suppose that the base station 2 is selected, the base station 2 transmits the connection possible signal 60 to the base station 3, and transmits the connection instruction 61 to the mobile station 1 to start setting the voice channel 32.

FIG. 11 shows a flowchart up to setting a communication path of the above-described embodiment. When the other zone base station receives the retransmission request (step 181) in a state of reserving observation of the voice channel of the other terminal (step 180), it transmits to the state of observing the other terminal voice channel (step 150), and it changes the frequency setting of the idle channel and the usage channel to the other terminal voice channel for an instance and observes the receiving level of the up voice channel of the peripheral base station. When it detects that the receiving level has exceeded the required minimum receiving level (step 151), it communicates the connection possible signal with the idle channel No., the number of idle channels, and the receiving level to the existing-in-zone base station (step 153) and, thereafter, it enters a state of waiting a response from the existing-in-zone base station (step 154). When it receives the connection instruction from the existing-in-zone base station (step 155), it sets a communication path (step 156), and it enters a state of observing the self terminal communication channel (step 160). In addition, when it receives a channel releasing instruction from the existing-in-zone base station (step 157). In addition, when it receives a channel releasing instruction from the existing-in-zone base station (step 157), it returns to the state of observing the other terminal voice channel (step 150).

On the other hand, when the existing-in-zone base station receives the connection possible signal from the other terminal (step 161) in the state of observing the self terminal voice channel (step 160), it starts a sequence of channel switching when the number of idle channels is larger than that of the self terminal (step 162).

In other words, after transmitting the connection instruction to the selected terminal (step 163), it transmits a channel designating signal designating a voice channel of the selected terminal to the mobile station (step 164), it enters a state of waiting a response from the mobile station (step 165), and when it receives a channel switching response (step 166), it returns to a state of observing the other terminal voice channel (step 150). When the number of idle channels is less than that of the self terminal (step 162), it transmits a channel releasing instruction (step 167), and it returns to the state of observing the self terminal voice channel (step 160).

In addition, when the number of idle channels is reduced (step 182) in the state where the existing-in-zone base station is observing the self terminal communication channel (step 182), it judges whether the number of idle channels has become below the prescribed value or not (step 183), and when the number of idle channels becomes below a prescribed value, it transmits a retransmission request signal (step 184), and when the number of idle channels is not below the prescribed value, it immediately returns to the state of observing the self terminal voice channel (step 160).

In this way, in the above-described embodiment, when the number of idle channels becomes below the prescribed level, this base station transmits a retransmission request signal for requesting retransmission of the connection possible signal to all the base stations which are not selected, the base station which is not selected and has received the retransmission request signal again confirms the receiving level and the number of idle channels, and if the situation is matched, it transmits the connection possible signal, and the selected base station which has received this, again selects the base station which satisfies the conditions judging the situations, whereby it is possible to prevent from the base station having a less number of idle channels from continuing a communication of a bad condition. Therefore, it is possible to prevent a communication from the other moving terminal being added to reduce the number of idle channels of this base station in the way of a base station being selected and performing a communication.

While in the above-described embodiment it is applied to a system which selects the base station having the maximum number of idle channels after setting the communication path, it may be applied to a system which selects the base station having the maximum number of idle channels before setting the communication channel as in the third embodiment with the same effect as in the third embodiment obtained.

As described above, according to a wireless mobile telephone apparatus of the present invention, since when the connection request signal from the mobile station is received by a plurality of base stations, the base station having a receiving level larger than the required minimum receiving level and having the maximum idle channel number is selected. Therefore, even in a wireless zone in which traffics are concentrated, it is possible to reduce the calling loss rate relative to the conventional system.

According to a wireless mobile telephone apparatus of the present invention, since it is requested that the connection possible signal is stopped to be transmitted to non-selected base stations from the base station which has started the communication, it is possible to prevent the connection possible signal from being transmitted continuously from the peripheral base stations after a base station is selected, whereby it can be suppressed that extra work loads to respective base stations increases and the exchange control is delayed.

According to a wireless mobile telephone apparatus of the present invention, since a retransmission request signal requesting all the non-selected base station to retransmit a connection possible signal is transmitted when the number of idle channels of the base station has become below a prescribed level in the way of the base station being selected and continuing the communication with the mobile station, it is possible to prevent that the base station having only a small number of idle channels continues a bad condition communication.

According to a wireless mobile telephone apparatus of the present invention, since a data signal also including the number of possessing idle channels is employed as the connection possible signal, it is quite apparent which base station has the maximum idle channel number, and the base station having the maximum margin can be easily selected.

What is claimed is:

1. A wireless mobile telephone system, comprising:

a plurality of base stations disposed so that each base station has its own wireless zone overlapping with the wireless zone of other base station to some extent;

a mobile station moving over the wireless zones produced by said base stations and performing a telephonic communication with any of said plurality of base stations;

said each of the base stations including:

a means for transmitting, when it is a non existing-in-zone base station in the zone of which the mobile station is not present and receives an origination signal from the mobile station at the start of telephonic communication, a connection possible signal to the existing-in-zone base station in the zone of which the mobile station is present;

a means for selecting, when it is an existing-in-zone base station and it receives the origination signal from the mobile station, a base station which has a receiving level larger than the required minimum receiving level and the maximum number of possessing idle channels among all the other base stations which have transmitted the connection possible signal and a self terminal of the existing-in-zone base station, as a base station to be connected with the mobile station; and and wherein said non existing-in-zone base station communicates, when it receives said origination signal from said mobile station and has an idle channel, that a connection with that mobile station is possible as well as idle channel Nos., the number of idle channels, and the receiving level to the existing-in-zone base station.

2. A wireless mobile telephone system, comprising:

a plurality of base stations disposed so that each base station has its own wireless zone overlapping with the wireless zone of other base station to some extent;

a mobile station moving over the wireless zones produced by said base stations and performing a telephonic communication with any of said plurality of base stations;

said each of the base stations including:

a means for transmitting, when it is a non existing-in-zone base station in the zone of which the mobile station is not present and receives an origination signal from the mobile station at the start of telephonic communication, a connection possible signal to the existing-in-zone base station in the zone of which the mobile station is present; and a means for selecting, when it is an existing-in-zone base station and it receives the origination signal from the mobile station, a base station which has a receiving level larger than the required minimum receiving level and the maximum number of possessing idle channels among all the other base stations which have transmitted the connection possible signal and the self terminal which is the existing-in-zone base station, as a base station to be connected with the mobile station;

said base station performing waiting receiving of an up control channel of any of peripheral base stations by changing a frequency of an idle channel during waiting receiving the self station control channel;

said base station performing waiting, for a prescribed time, presence of a connection possible signal from any of said peripheral base stations when it receives a connection request signal from the mobile station through the self station control channel in said waiting receiving state;

said base station selecting, when it receives a connection possible signal from other base station and a prescribed time passes over, the base station which has a receiving level above the required minimum receiving level and has the maximum number of idle channels among the base stations the connection possible signal from which the base station received and the self base station, as a base station to be connected with the mobile station;

said base station acts, after the selection, as follows:

when the selected base station is the self station, it transmits a channel releasing instruction to all the base stations which have transmitted connection possible signals and transmitting a channel designating signal designating a voice channel of the self terminal to the mobile station to establish a communication path;

when the selected base station is other base station it transmits channel releasing instructions to the non-selected base stations among the base stations which have transmitted the connection possible signals and a connection instruction to the selected terminal, transmits a channel designating signal designating a voice channel of the selected terminal to the mobile station, and returns to the waiting receiving state;

said base station, when it receives the connection possible signal from the mobile station through the other terminal control channel during the above-described waiting receiving state, transmits a connection possible signal to the existing-in-zone terminal and waits an instruction from the existing-in-zone base station when it has an idle channel, and returns again to the waiting receiving state when it has no idle channel;

said base station, when it receives a connection instruction from the existing-in-base terminal during waiting an instruction from the existing-in-zone base station, establishes a communication path; and said base station, when it receives a channel releasing instruction during waiting an instruction from the existing-in-zone base terminal, returns to the waiting state.

3. A wireless mobile telephone system, comprising:

a plurality of base stations disposed so that each base station has its own wireless zone overlapping with the wireless zone of other base station to some extent;

a mobile station moving over the wireless zones produced by said base stations and performing a telephonic communication with any of said plurality of base stations;

said each of the base stations including:

a means for transmitting, when it is a non existing-in-zone base station in the zone of which the mobile station is not present and receives an origination signal from the mobile station at the start of telephonic communication, a connection possible signal to the existing-in-zone base station in the zone of which the mobile station is present;

a means for selecting, when it is an existing-in-zone base station and it receives the origination signal from the mobile station, a base station which has a receiving level larger than the required minimum receiving level and the maximum number of possessing idle channels among all the other base stations which have transmitted the connection possible signal and a self terminal of the existing-in-zone base station, as a base station to be connected with the mobile station;

and wherein said existing-in-zone base station includes means for transmitting, when the number of idle channels of the self station becomes below a prescribed value during continuing a communication with the mobile station, a retransmitting request signal requesting all other base stations which receive the origination signal from the mobile station above a prescribed level to retransmit a connection possible signal.

4. A wireless mobile telephone system, comprising:

a plurality of base stations disposed so that each base station has its own wireless zone overlapping with the wireless zone of other base station to some extent;

a mobile station moving over the wireless zones produced by said base stations and performing a telephonic communication with any of said plurality of base stations;

said each of the base stations including:

a means for transmitting, when it is a non existing-in-zone base station in the zone of which the mobile station is not present and receives a signal from the mobile station during when an existing-in-zone terminal in the zone of which the mobile station is present continues a telephonic communication with the mobile station, and when the receiving level is above the required minimum receiving level and the number of idle channels is larger than a prescribed value for the self non existing-in-zone terminal, a connection possible signal to the existing-in-zone base station;

a means for comparing, when it is the existing-in-zone base station and it receives the connection possible signal, the numbers of idle channels of the self station and the non existing-in-zone base station, and selecting the base station having a larger number of idle channels to continue the communication; and wherein said each of the base stations which is not the existing-in-zone base station observes the receiving level of the communication channel by an up communication channel of any of peripheral base stations and the non existing-in-zone base station during its observing state, communicates that a connection is possible as well as the idle channel Nos., the number of idle channels, and the receiving level to the existing-in-zone base station when it has an idle channel in this observing state.

5. The wireless mobile system of claim 4 wherein said existing-in-zone base station compares the numbers of idle channels and receiving levels of the self station and the non-existing base station and selects the base station having the receiving level above the required minimum receiving level and the maximum number of idle channels among them, and the selected base station transmits a connection possible signal to the non-selected base station and transmits a connection instruction to the mobile station to establish a voice channel.

6. The wireless mobile telephone system of claim 5 wherein:

the base station of other wireless zone observes the receiving level of an up communication channel of any of peripheral base stations by changing a frequency of one of idle channels and a usage channel of the self station for an instance during observing the communication channel of the other terminal;

the base station of other wireless zone communicates, when it detects that the receiving level exceeds the required minimum receiving level and it has an idle channel, a connection is possible as well as the idle channel Nos., the number of idle channels, and the receiving level to the existing-in-zone base station and enters a state of waiting a response from the existing-in-zone base station;

the base station of other wireless zone, when it receives a connection instruction from the existing-in-zone base station, establishes a communication path and enters an observing state observing voice channels of the self station;

said base station of other wireless zone, when it receives a channel releasing instruction from the existing-in-zone base station, returns to the observing state of observing the voice channel of the other base station;

said existing-in-zone base station, when it receives a connection possible signal from the other base station during observing the voice channel of the self station, performs a sequence of channel switching when the number of idle channels of the other base station is larger than that of the self station, and when the number of idle channels is smaller than that of the self station, transmits a channel releasing instruction to the other terminal and returns to the state of observing the voice channel of the self station.

7. A wireless mobile telephone system, comprising:

a plurality of base stations disposed so that each base station has its own wireless zone overlapping with the wireless zone of other base station to some extent;

a mobile station moving over the wireless zones produced by said base stations and performing a telephonic communication with any of said plurality of base stations;

said each of the base stations including:

a means for transmitting, when it is a non existing-in-zone base station in the zone of which the mobile station is not present and receives a signal from the mobile station during when an existing-in-zone terminal in the zone of which the mobile station is present continues a telephonic communication with the mobile station, and when the receiving level is above the required minimum receiving level and the number of idle channels is larger than a prescribed value for the self non existing-in-zone terminal, a connection possible signal to the existing-in-zone base station;

a means for comparing, when it is the existing-in-zone base station and it receives the connection possible signal, the numbers of idle channels of the self station and the non existing-in-zone base station, and selecting the base station having a larger number of idle channels to continue the communication; and wherein said base station includes means for transmitting, when the number of idle channels of the self station becomes below a prescribed value during continuing a communication with the mobile station, a retransmitting request signal requesting all other base stations which receive the signal from the mobile station above a prescribed level to retransmit a connection possible signal.

* * * * *